United States Patent
Dhanuka et al.

(10) Patent No.: US 11,321,582 B2
(45) Date of Patent: May 3, 2022

(54) EXTRACTING AND ORGANIZING REUSABLE ASSETS FROM AN ARBITRARY ARRANGEMENT OF VECTOR GEOMETRY

(71) Applicant: Adobe Inc., San Jose, CA (US)

(72) Inventors: Praveen Kumar Dhanuka, Howrah (IN); Vineet Batra, Pitam Pura (IN); Sumit Dhingra, New Delhi (IN); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 170 days.

(21) Appl. No.: 16/909,220

(22) Filed: Jun. 23, 2020

(65) Prior Publication Data

US 2021/0397887 A1    Dec. 23, 2021

(51) Int. Cl.
*G06T 7/60* (2017.01)
*G06K 9/62* (2022.01)

(52) U.S. Cl.
CPC .......... *G06K 9/6252* (2013.01); *G06K 9/6218* (2013.01); *G06T 7/60* (2013.01)

(58) Field of Classification Search
CPC ........ G06T 2207/30232; G06T 7/0012; H04N 1/40093; H04N 1/603; G06K 9/6262; G06K 9/6277
See application file for complete search history.

(56) References Cited

U.S. PATENT DOCUMENTS

| | | | | |
|---|---|---|---|---|
| 6,885,817 B2* | 4/2005 | Artonne | ............... | H04N 5/2251 396/419 |
| 6,954,282 B2* | 10/2005 | Miyamoto | ............. | G06K 15/00 358/1.18 |
| 7,221,475 B1* | 5/2007 | Ikeda | ..................... | G03G 15/06 358/1.9 |
| 7,319,792 B2* | 1/2008 | Hara | .................... | H04N 19/132 375/E7.172 |
| 8,150,139 B2* | 4/2012 | Couronne | ............. | G07D 5/005 382/136 |

(Continued)

OTHER PUBLICATIONS

Paul Asente, Mike Schuster, and Teri Pettit. Dynamic planar map illustration. In ACM SIGGRAPH 2007 Papers, SIGGRAPH '07, p. 30-es, New York, NY, USA, 2007. Association for Computing Machinery.

(Continued)

*Primary Examiner* — Yosef Kassa
(74) *Attorney, Agent, or Firm* — Keller Preece PLLC

(57) ABSTRACT

The present disclosure relates to systems, methods, and non-transitory computer readable media for efficiently and flexibly extracting reusable geometric assets from an arbitrary arrangement of vector geometry within a digital image. For example, the disclosed systems can organize vector geometry of a digital image by structuring geometric objects into groups (e.g., clusters). The disclosed systems can assign mnemonics to these groups and transform the digital image into a mnemonic sequence. Moreover, the disclosed systems can utilize various computer-implemented algorithms to identify and filter patterns within the mnemonic sequence. The disclosed systems can then generate pattern scores for these patterns and identify which patterns of geometric objects to include within a set of reusable geometric assets.

20 Claims, 12 Drawing Sheets

(56) References Cited

U.S. PATENT DOCUMENTS 8,213,683 B2 * 7/2012 Chen .................. G08G 1/166
    382/104
8,487,992 B2 * 7/2013 Seri ..................... G06T 1/60
    348/133

OTHER PUBLICATIONS

Knut Reinert, Temesgen Hailemariam Dadi, Marcel Ehrhardt, Hannes Hauswedell, Svenja Mehringer, Ren'e Rahn, Jongkyu Kim, Christopher Pockrandt, J org Winkler, Enrico Siragusa, Gianvito Urgese, and David Weese. The seqan C++ template library for efficient sequence analysis: A resource for programmers. Journal of Biotechnology, 261:157-168, Nov. 2017.

* cited by examiner

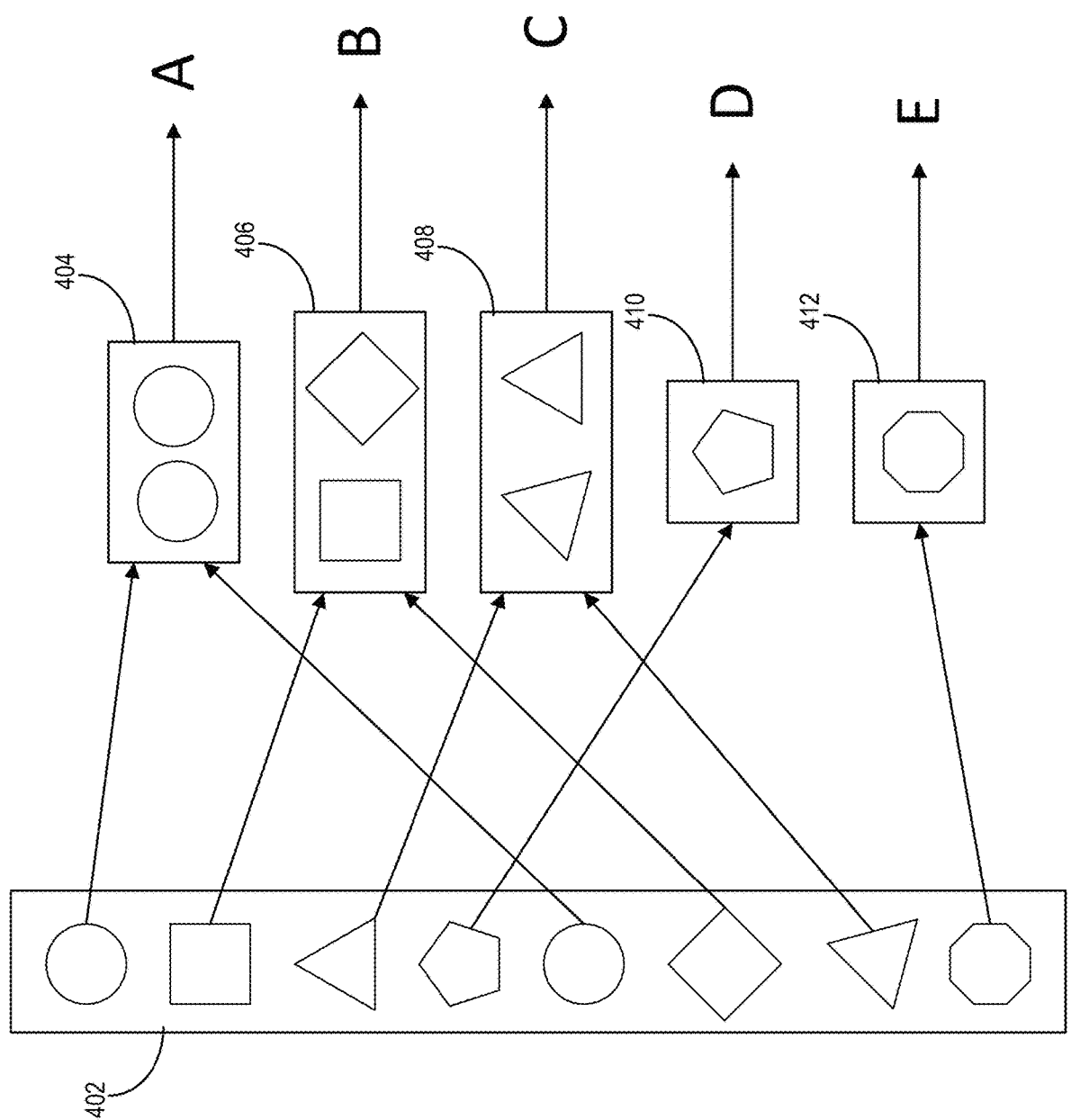

EXTRACTING AND ORGANIZING REUSABLE ASSETS FROM AN ARBITRARY ARRANGEMENT OF VECTOR GEOMETRY

BACKGROUND

In the field of digital image editing, designer devices often utilize image editing systems to create rich vector graphic illustrations, sometimes with highly complex geometry. Vector graphic designs often consist of complex shapes, repetitions, and repeated geometric figures. While many systems can create and modify digital images with such complex structures, these conventional digital image editing systems often require extensive designer actions to perform certain functions, such as creating custom symbols for repeated constructs of a digital image and organizing features of a digital image into hierarchies. Thus, not only do these systems detract from the creative process by requiring tedious designer interaction for otherwise non-creative tasks, but conventional digital image editing systems further suffer from a number of disadvantages in efficiency, flexibility, and accuracy.

SUMMARY

One or more embodiments described herein provide benefits and solve one or more of the foregoing or other problems in the art with systems, methods, and non-transitory computer readable media that can efficiently and flexibly extract reusable geometric assets from an arbitrary arrangement of vector geometry within a digital image. For example, the disclosed systems can efficiently detect reusable assets in vector geometry by identifying mnemonic patterns, filtering redundant/irrelevant patterns, and ranking these patterns according to visual saliency, geometric complexity, and repetition. To illustrate, the disclosed system can identify vector assets of a digital image by structuring vector geometries (i.e., geometric objects) into groups or clusters. The disclosed systems can assign mnemonics to these groups and analyze a mnemonic sequence representation of the digital image to identify repeating patterns. The disclosed systems can analyze these patterns, intelligently eliminate sub-optimal patterns, and utilize visual saliency metrics, geometric complexity metrics, and frequency metrics to isolate geometric assets from the digital image. In this manner, the disclosed systems can efficiently and accurately identify a wide array of geometric assets that can be utilized in generating modified digital images (e.g., selecting the geometric assets for modification or adding the geometric assets to a digital image).

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 4 illustrates generating geometric object clusters in accordance with one or more embodiments;

DETAILED DESCRIPTION

Figure 1:
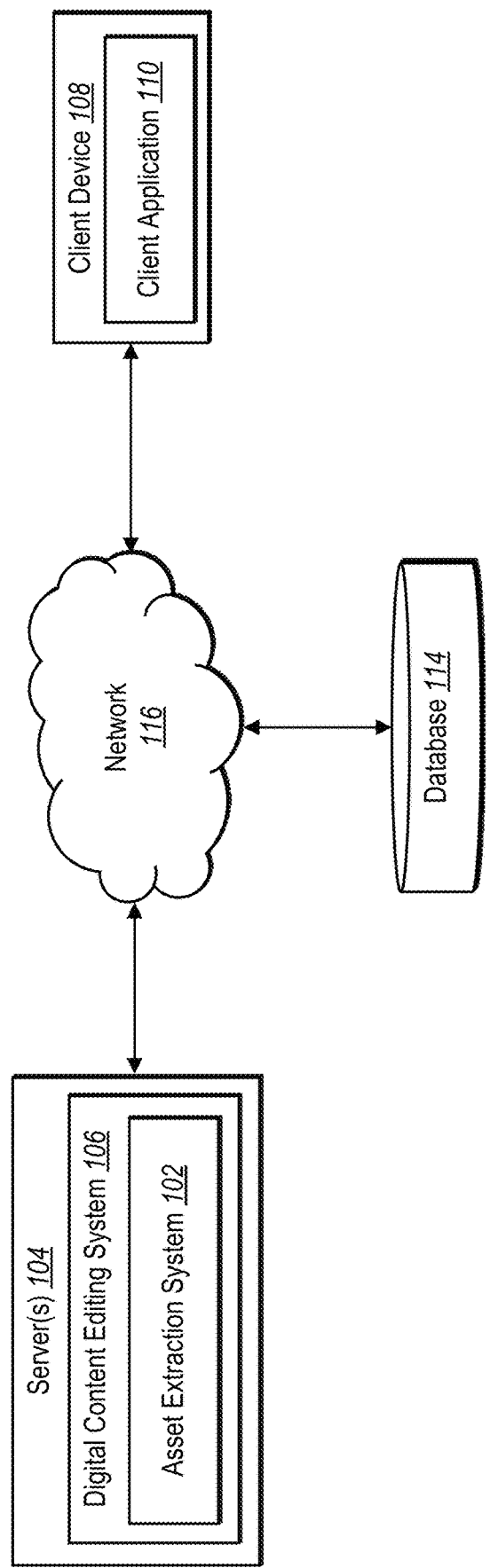
FIG. 1 illustrates an example system environment in which an asset extraction system can operate in accordance with one or more embodiments.

One or more embodiments described herein include an asset extraction system that can extract and organize reusable assets from an arbitrary arrangement of vector geometry within a digital image. In particular, the asset extraction system can automatically (i.e., without user input) generate a set of reusable geometric assets from a digital image based on analyzing patterns associated with vector geometries (i.e., geometric objects) identified within the digital image. For example, the asset extraction system can generate reusable geometric assets that are selectable to add to a digital image within a digital image editing interface. To this end, the asset extraction system can generate mnemonic sequences representing geometric objects within a digital image and can analyze patterns within the mnemonic sequences. The asset extraction system can determine relationships between geometric objects based on the analysis of the patterns of mnemonics to determine which patterns to include in a set of reusable geometric assets.

As mentioned, the asset extraction system can generate mnemonic sequences to represent geometric objects (vector geometries) within a digital image. In particular, the asset extraction system can analyze a digital image to identify geometric objects within the digital image. Upon identifying the geometric objects, the asset extraction system can utilize a clustering algorithm to organize geometric objects into clusters. Additionally, the asset extraction system can assign mnemonics to individual geometric object clusters and utilize the mnemonics to represent any objects grouped within the respective clusters. In some embodiments, the asset extraction system further generates one or more mnemonic sequences by appending cluster-specific mnemonics together into a string of mnemonics that represents the arrangement of geometric objects within the digital image.

Additionally, the asset extraction system can analyze patterns of mnemonic sequences to identify reusable geometric assets. For example, the asset extraction system can utilize a biological sequence matching approach to identify repeating patterns within a mnemonic sequence representing a digital image. More specifically, the asset extraction system can identify patterns of non-overlapping occurrences of two or more consecutive mnemonics. For instance, the asset extraction system can identify non-overlapping maximal patterns within a mnemonic sequence representing the digital image.

In some embodiments, the asset extraction system generates a filtered pattern set by eliminating, excluding, or filtering out those patterns that do not satisfy various criteria. For example, the asset extraction system can exclude patterns that have zero non-overlapping repeats within a mnemonic sequence. In addition, the asset extraction system can eliminate redundant patterns from inclusion in the filtered pattern set. To this end, the asset extraction system can identify redundant patterns using a number of techniques.

As one technique, the asset extraction system can implement an intra-pattern sequence analysis to identify and exclude redundant patterns from the filtered pattern set. To elaborate, the asset extraction system can identify redundant patterns as patterns composed entirely of a single sub-pattern and/or patterns that repeat only inside a larger, non-redundant pattern. In some embodiments, the asset extraction system also excludes patterns whose length satisfies a threshold percentage (e.g., 75%) of a total length of the mnemonic sequence.

As another technique for identifying redundant patterns, the asset extraction system can utilize an inter-pattern sequence analysis to identify and remove redundant patterns. More specifically, the asset extraction system can perform a joint analysis of one mnemonic pattern with other mnemonic patterns to identify redundant patterns. For example, the asset extraction system can identify a sub-sequence of mnemonics within an encompassing sequence (e.g., a mnemonic sequence that includes the sub-sequence) and can determine a repeat count for both the sub-sequence and the encompassing sequence. By comparing the repeat counts of the sub-sequence and the encompassing sequence, the asset extraction system can determine whether either the sub-sequence or the encompassing sequence are redundant. Additional detail regarding inter-pattern redundancy determinations including comparing repeat counts is provided below with reference to the figures.

In addition to intra-pattern analysis and inter-pattern analysis for identifying redundant patterns, the asset extraction system can utilize spatial information to identify and remove redundant patterns. In particular, the asset extraction system can identify spatially redundant patterns based on analyzing faces and edges of geometric objects within a pattern (or corresponding to mnemonics within a pattern). For instance, the asset extraction system can determine that a pattern is redundant if the pattern is composed of one or more disjoint objects and/or if the pattern has trivial geometry (e.g., its geometric complexity fails to satisfy a geometric complexity threshold).

Upon identifying and removing redundant patterns via one or more of the above techniques, the asset extraction system can further utilize the filtered pattern set to identify reusable geometric assets from the geometric objects that are depicted within the digital image. In particular, the asset extraction system can determine pattern scores for the patterns within the filtered pattern set that indicate sets of geometric objects to select for geometric assets. For example, the asset extraction system can determine pattern scores based on various metrics such as frequency metrics, visual saliency metrics, and geometric complexity metrics.

In some embodiments, the asset extraction system can rank patterns based on their respective pattern scores. Based on rankings and/or the pattern scores, the asset extraction system can select patterns (which indicate sets of geometric objects) to include within a set of reusable geometric assets. Moreover, the asset extraction system can utilize these assets (e.g., to copy the assets within a digital image or to select and modify the assets within a digital image).

As mentioned above, conventional digital image editing systems suffer from a number of technical problems. For example, many conventional systems are inflexible in their functionality for generating digital images. Particularly, conventional systems often rigidly require designer interaction to create custom symbols for repeated use of a design component and to organize components of a digital image into hierarchies. To elaborate, if a designer wishes to reuse a particular custom component within a digital image, conventional systems require the designer to go through excessive steps and provide numerous inputs to various user interfaces to identify the constituent pieces of a design component and then generate a custom symbol to reuse the design component at a later time. Along similar lines, conventional systems cannot flexibly determine a hierarchical structure for a complex, multi-layered vector image, but instead require designers to expressly assign individual layers during the creation process. As a result of the tedious and inflexible requirements of such systems, these conventional digital image editing systems often generate disorganized, incoherent, and arbitrary geometric structures with a flat hierarchy for a vector digital image. Such disorganization often renders reconstruction and/or editing of digital images created using conventional systems impractical, if not impossible.

Due at least in part to their inflexibility, conventional digital image editing systems are also inefficient. As just mentioned, conventional systems require excessive user interfaces and user interactions to isolate, re-utilize, and organize design components within a digital image. Conventional systems inefficiently utilize computing resources such as processing time, processing power, and memory in analyzing these user interactions and providing various interfaces. In addition, because of the unstructured, incoherent nature of digital images created by conventional systems, many of these systems further struggle to effectively and efficiently identify particular design components within digital images (e.g., in applying semantic tagging models). Further, the unstructured nature of conventional systems results in significant performance issues, especially on mobile devices with limited processing capabilities, when it comes to complex digital images with larger file sizes.

Beyond inflexibility and inefficiency, many conventional digital image editing systems are also inaccurate. In particular, conventional systems often inaccurately identify similar constituent objects within digital images. For example, a digital image may use a particular circular object as part of a circular light and also as part of a circular shadow. Conventional systems often cannot distinguish between the contextual uses of such an object. Accordingly, conventional systems often inaccurately identify constituent graphical objects that are actually unrelated with regard to the contextual design components utilized within the digital image.

Some conventional systems can detect and identify objects in the raster domain, but these systems fail to address these technical problems. For example, some systems can convert a vector image to a raster image and utilize a neural network to detect objects from the raster image. However, due to occlusion and overlapping paths (and complexity of vector paths), reverse mapping the results from the raster domain to the vector domain is an unsolved problem. Accordingly, systems that utilize raster images and neural networks cannot accurately identify the vector geometry of design components within a vector image.

As suggested above, the asset extraction system can provide several advantages over conventional digital image editing systems. For example, the asset extraction system is more flexible than conventional systems. In particular, while many conventional systems rigidly require interaction from users (e.g., designers) to determine hierarchies of objects within digital images and to create custom symbols for repeated use of objects, the asset extraction system can automatically (e.g., without user input) generate sets of reusable geometric assets and organize digital images into clusters of objects. Indeed, by determining and filtering mnemonic patterns corresponding to geometric objects within digital images, the asset extraction system can adaptively generate different sets of reusable geometric assets for different digital images without user input to define any particular assets or symbols.

In addition to improved flexibility and functionality, the asset extraction system can further improve efficiency relative to many conventional digital image editing systems. In particular, the asset extraction system utilizes one or more algorithms that are faster than those of conventional systems (e.g., much less computationally expensive than training and utilizing neural networks) but can extract reusable geometric assets from complex vector graphics in real time or near real time. Further, as opposed to conventional systems that require large numbers of user interactions and interfaces to generate reusable symbols, the asset extraction system processes far fewer (e.g., zero or one) user inputs. Indeed, by determining and filtering patterns within mnemonic sequences that represent geometric objects within digital images, the asset extraction system not only creates a much more efficient, structured organization for the digital images, but also utilizes fewer computing resources such as processing time, processing power, and memory in processing user inputs, as compared to conventional systems.

As another example of improved efficiency, the asset extraction system can effectively handle arbitrary complex vector files with relative ease, executing in parallel fashion to generate results in real time. Indeed, the asset extraction system can analyze and determine pattern scores for repeating patterns (within a filtered pattern) set in parallel. In some embodiments, the asset extraction system can also extract reusable geometric assets from multiple digital images (e.g., multiple vector digital images) in parallel. Thus, unlike conventional systems that exhibit performance issues with complex vector graphics, especially on the limited capabilities of mobile devices, the asset extraction system implements one or more algorithms that more efficiently process digital images with complex vector graphics. Compared to conventional systems, the asset extraction system can process large numbers of digital images to (automatically) extract reusable geometric assets from entire libraries or databases of digital images.

Additionally, through the process of extracting reusable geometric assets, the asset extraction system can automatically tag or label digital images (or identify for more significant assets to submit for tagging), including vector files which were previously untagged. Thus, the asset extraction system can improve the searching of digital images by tagging digital images and making them searchable within a database.

Further, the asset extraction system can improve accuracy relative to conventional systems. Where conventional systems are often incapable of distinguishing between variations in patterns within a digital image, the asset extraction system can identify patterns and can modify geometric objects that are within a particular pattern of a digital image. For example, if a user selects a shadow to modify, where the shadow is made up of one or more circles, the asset extraction system can identify and modify only those circles within the identified pattern that corresponds to circle (while a conventional system would modify all affine variations of a circle, irrespective of their context).

As suggested by the foregoing discussion, the present disclosure utilizes a variety of terms to describe features and benefits of the asset extraction system. Additional detail is hereafter provided regarding examples of these terms. For example, a digital image can include a digital file or object for portraying digital visual content. A digital image can refer to a vector image that includes a plurality of vector-based geometric objects that make up the various design components shown in the digital image.

Additionally, a geometric object can include a vector geometry, path, shape, or spline within a digital image. A geometric object can refer to a line, curve, or other shape (e.g., indicated by a particular Bezier spline. Indeed, a geometric object can include an individual vector geometry that is part of a larger vector graphic. For example, a geometric object can refer to a curved side of a bottle, while the top curve of the bottle, the bottom curve of the bottle, and the opposite side curve of the bottle can be illustrated by their own respective geometric objects (e.g., splines).

Relatedly, reusable geometric asset (or simply "geometric asset") can include a combination or a set of two or more geometric objects forming a shape, entity, article, or thing. A reusable geometric asset can refer to a selectable icon or symbol of a particular shape (e.g., a shape made up of multiple geometric objects) depicted within a digital image for reproducing or reusing within a digital image. As discussed in greater detail below, the asset extraction system can identify geometric assets as a plurality of geometric objects represented by a repeating pattern within a mnemonic sequence.

As mentioned, the asset extraction system can generate geometric object clusters from objects in a digital image or a group of digital images. For example, a geometric object cluster (or "object cluster" or simply "cluster") can include a group of (identical or similar variations of) a geometric object from a digital image. To illustrate, for a digital image that contains repeated uses of a spline in the shape of a triangle (with different orientations), the asset extraction system can generate a geometric object cluster reflecting all uses of the triangle (including all affine variations of the triangle within the digital image). Indeed, the asset extraction system can utilize a clustering algorithm to generate multiple clusters for geometric objects based on determining relationships (e.g., affine similarity) between objects. Based on the relationships, the asset extraction system can group affine transformations (e.g., rotated variations or mirrored variations of an object) of geometric objects together in the same cluster. Thus, a geometric object cluster can include geometric objects that look alike and that satisfy a threshold similarity with one another.

As also mentioned, the asset extraction system can assign mnemonics to individual object clusters to indicate geometric objects within the clusters. For example, a mnemonic can include an assigned label for an object cluster. A mnemonic can include one or more alphanumeric characters representing an object cluster. A mnemonic can include a character that, upon assignment to a particular object cluster, represents all geometric objects within the object cluster. Along these lines, the asset extraction system can generate one or more mnemonic sequences to represent geometric objects within an entire digital image. Similarly, a mnemonic sequence can include a sequence or a string of two or more mnemonics appended together. A mnemonic sequence can therefore represent a set of geometric objects from a digital image, where each object corresponds to a respective mnemonic in the sequence. Indeed, the asset extraction system can generate a mnemonic sequence for a digital image by appending mnemonics of identified geometric object clusters for objects in the digital image.

To generate a set of reusable geometric assets from a digital image, the asset extraction system can identify and filter patterns within a mnemonic sequence to select those patterns that satisfy various criteria. For example, a pattern can include a sub-string or a sub-sequence of two or more consecutive mnemonics within a mnemonic sequence. A repeating pattern can thus include a string of two or more consecutive mnemonics that occurs more than once within a mnemonic sequence. Additionally, because mnemonics correspond to objects within object clusters, a pattern can also refer to a set of two or more (consecutive) geometric objects within a digital image (e.g., geometric objects that are adjacent like their counterpart mnemonics in the sequence). Further, a maximal repeating pattern (or sometimes "maximal pattern") can include a repeating pattern of the longest possible string or the largest possible number of consecutive mnemonics that accounts for each repeat occurrence of the string within the sequence. For instance, given a mnemonic sequence of "ABCDABCE," a maximal pattern would be "ABC," while "AB" would not be a maximal pattern since it is not the longest possible repeating string that includes each instance of "AB", even though it does repeat within the sequence.

Relatedly, a pattern score can include a score or a measure for ranking patterns within a digital image. For example, a pattern score refers to or indicates relative significance of a pattern. A pattern score can include a weighted combination (e.g., a weighted linear combination) of factors associated with a pattern such as frequency metrics, visual saliency metrics, and geometric complexity metrics.

As mentioned above, the asset extraction system can generate a filtered pattern set by removing or excluding redundant patterns from the filtered pattern set. For example, the term redundant can refer to a pattern that has already been identified as repeating within a mnemonic sequence. A redundant pattern can also include an insignificant or irrelevant pattern (e.g., a pattern that does not satisfy a geometric complexity threshold). Indeed, the asset extraction system identifies redundant patterns as patterns with multiple repeat occurrences within a mnemonic sequence. The asset extraction system further excludes the redundant patterns to include only unique and/or significant repeating patterns (and thereby identify unique geometric assets) within a filtered pattern set. Relatedly, the term "filtered pattern set" refers to a set or a group of patterns that have not been filtered out based on filtering criteria and from which the asset extraction system selects reusable geometric assets.

To determine a pattern score, the asset extraction system can determine constituent metrics that make up the pattern score, such as frequency metrics, visual saliency metrics, and geometric complexity metrics. For example, frequency metrics (or "frequency") can include a measure of repetition (e.g., a repetition count) of a pattern within a mnemonic sequence. In addition, a visual saliency metric (or "visual saliency") can include a measure of visual importance, visual prominence, and/or visual distinctiveness of a pattern (or group of geometric objects) within a digital image. A visual saliency metric can include an area that a pattern (or group of geometric objects) occupies within a digital image (e.g., a total area covered by all instances of the pattern). Further, the term "geometric complexity metric" (or "geometric complexity") refers to as measure of complexity or geometric variation of a pattern (or group of geometric objects) within a digital image. Geometric complexity can include a measure of planar faces and/or planar edges of a pattern (or group of geometric objects).

Additional detail regarding the asset extraction system will now be provided with reference to the figures. For example, FIG. 1 illustrates a schematic diagram of an example system environment for implementing an asset extraction system 102 in accordance with one or more embodiments. An overview of the asset extraction system 102 is described in relation to FIG. 1. Thereafter, a more detailed description of the components and processes of the asset extraction system 102 is provided in relation to the subsequent figures.

As shown, the environment includes server(s) 104, a client device 108, a database 114, and a network 116. Each of the components of the environment can communicate via the network 116, and the network 116 may be any suitable network over which computing devices can communicate. Example networks are discussed in more detail below in relation to FIG. 10.

As mentioned, the environment includes a client device 108. The client device 108 can be one of a variety of computing devices, including a smartphone, a tablet, a smart television, a desktop computer, a laptop computer, a virtual reality device, an augmented reality device, or another computing device as described in relation to FIG. 10. Although FIG. 1 illustrates a single client device 108, in some embodiments the environment can include multiple different client devices, each associated with a different user (e.g., designer). The client device 108 can communicate with the server(s) 104 via the network 116. For example, the client device 108 can receive user input from a user interacting with the client device 108 (e.g., via the client application 110) to, for example, select a digital image, edit a digital image, modify an attribute of a digital image, or generate a modified digital image. In some embodiments, the client device 108 receives a user interaction to identify or extract reusable geometric assets from a digital image (or from a user-defined portion of a digital image). Thus, the asset extraction system 102 on the server(s) 104 can receive information or instructions to extract reusable geometric assets (or can do so automatically without user input) and can generate a modified digital image (e.g., by including one or more reusable geometric assets) based on the input received by the client device 108.

As shown, the client device 108 includes a client application 110. In particular, the client application 110 may be a web application, a native application installed on the client device 108 (e.g., a mobile application, a desktop application, etc.), or a cloud-based application where all or part of the functionality is performed by the server(s) 104. The client application 110 can present or display information to a user, including a user interface for editing, manipulating, creating, or otherwise interacting with a digital image. Additionally, the client application 110 can present interactive elements in the form of buttons or tools selectable to edit a digital image or generate a new digital image. The client application 110 can also include an asset window or some other portion of a graphical user interface dedicated to reusable geometric assets and that includes selectable options for adding the geometric assets to a digital image. A user can interact with the client application 110 to provide user input to perform an operation as mentioned above, such as modifying a digital image to by adding a reusable geometric asset.

As illustrated in FIG. 1, the environment includes the server(s) 104. The server(s) 104 may generate, track, store, process, receive, and transmit electronic data, such as digital images, spatial codes, global codes, and user interactions to manipulate digital images. For example, the server(s) 104 may receive data from the client device 108 in the form of a request to edit a digital image. In addition, the server(s) 104 can transmit data to the client device 108 to provide a modified digital image for display within a user interface of the client application 110. Indeed, the server(s) 104 can communicate with the client device 108 to transmit and/or receive data via the network 116. In some embodiments, the server(s) 104 comprises a distributed server where the server(s) 104 includes a number of server devices distributed across the network 116 and located in different physical locations. The server(s) 104 can comprise a content server, an application server, a communication server, a web-hosting server, or a machine learning server.

As shown in FIG. 1, the server(s) 104 can also include the asset extraction system 102 as part of a digital content editing system 106. The digital content editing system 106 can communicate with the client device 108 to perform various functions associated with the client application 110 such as providing and modifying a digital image. For example, the asset extraction system 102 can communicate with the database 114 to access and store digital images and to access and store information such as geometric objects, mnemonic sequences, and reusable geometric assets. Indeed, as further shown in FIG. 1, the environment includes a database 114. In particular, the database 114 can store information such as digital images, geometric objects, mnemonics, patterns, and reusable geometric assets. In some embodiments, the database 114 also stores one or more components of a clustering algorithm in addition to pattern-specific information such as frequency metrics, visual saliency metrics, and geometric complexity metrics.

Although FIG. 1 illustrates a particular arrangement of the environment, in some embodiments, the environment may have a different arrangement of components and/or may have a different number or set of components altogether. For instance, in some embodiments, the asset extraction system 102 may be implemented by (e.g., located entirely or in part) on the client device 108 and/or a third-party device. In addition, the client device 108 may communicate directly with the asset extraction system 102, bypassing the network 116. Further, the database 114 can be located external to the server(s) 104 (e.g., in communication via the network 116) or located on the server(s) 104 and/or on the client device 108.

Figure 2:
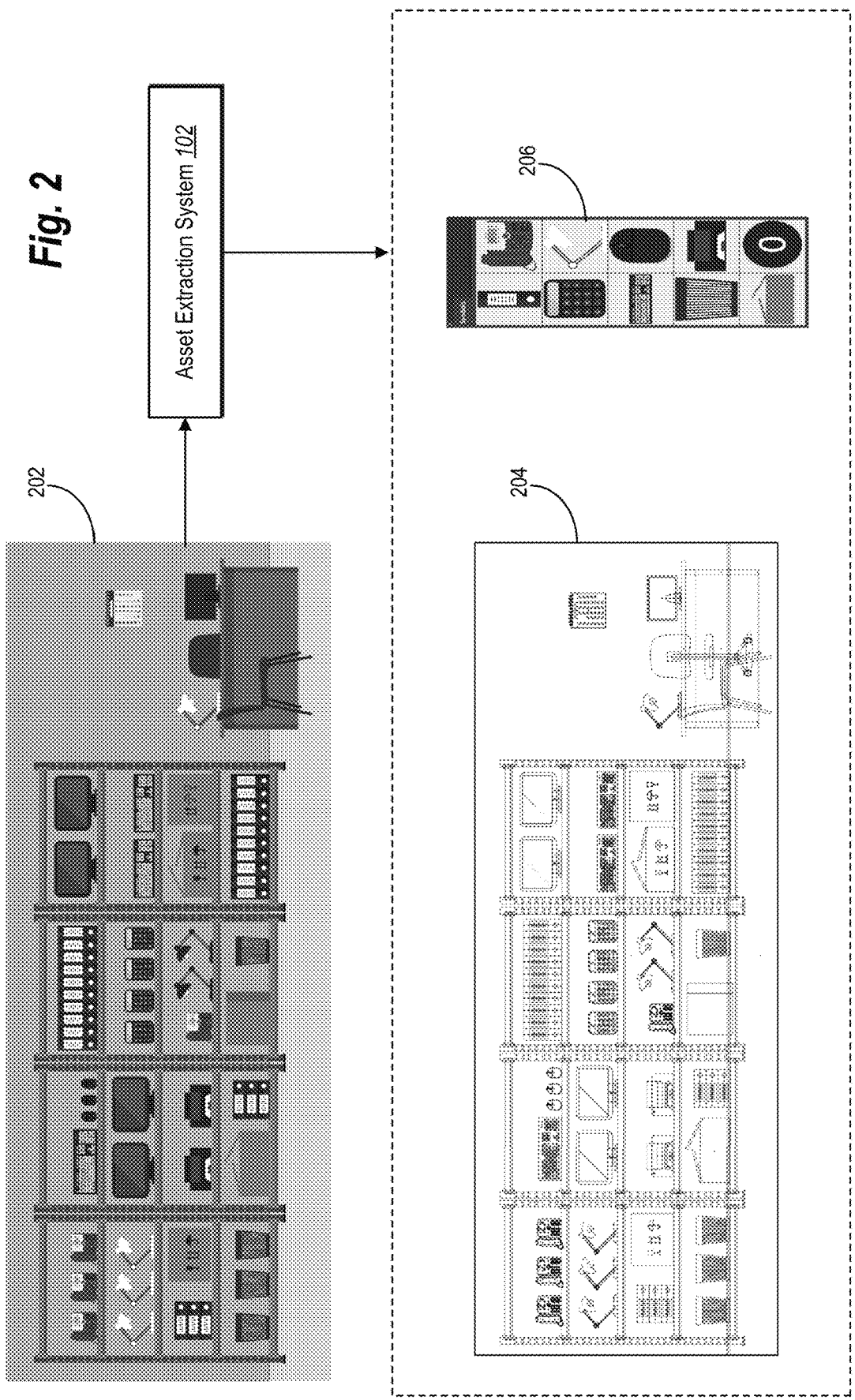
FIG. 2 illustrates an overview of generating a set of reusable geometric assets from a digital image in accordance with one or more embodiments.

As mentioned, the asset extraction system 102 can generate a set of reusable geometric assets to include as selectable options within a graphical user interface. In particular, the asset extraction system 102 can analyze a digital image to identify and cluster geometric objects and can assign mnemonics to the object clusters. The asset extraction system 102 can further generate one or more mnemonic sequences to represent the objects within a digital image and can identify patterns within the one or more mnemonic sequences to include within a set of reusable geometric assets. FIG. 2 illustrates a digital image 202 that the asset extraction system 102 analyzes to generate an outline representation of image geometry 204 (e.g., a set of geometric objects within the digital image 202) and a set of reusable geometric assets 206 in accordance with one or more embodiments.

As illustrated in FIG. 2, the asset extraction system 102 analyzes the digital image 202 to identify geometric objects. In particular, the asset extraction system 102 utilizes one or more object recognition techniques to identify geometric objects and to group the identified objects into clusters based on appearance. For example, the asset extraction system 102 identifies similar objects by identifying objects as two-dimensional paths of Bezier splines, bucketing the geometric objects, comparing geometric objects to determine similarities between them (e.g., by determining affine transformations of geometric objects such as rotation, translation, and scaling), and grouping the geometric objects into clusters with other similar objects. The asset extraction system 102 thus groups geometric objects into clusters, where a given cluster includes affine transformations of the same object. The asset extraction system 102 can utilize a variety of computer-implemented clustering models. In some embodiments, the asset extraction system 102 utilizes the object identification and clustering techniques described by Sumit Dhingra, Vineet Batra, Praveen Kumar Dhanuka, and Ankit Phogat in U.S. patent application Ser. No. 16/835,123, entitled Optimizing Graphics Geometry Using Similarity-Based Clustering (filed Mar. 30, 2020), which is incorporated by reference herein in its entirety. The outline representation of image geometry 204 in FIG. 2 illustrates the geometric objects identified within the digital image 202.

In addition, the asset extraction system 102 assigns mnemonics to the individual object clusters and generates a mnemonic sequence (or multiple mnemonic sequences) including the mnemonics that represent the geometric objects within the digital image 202. The asset extraction system 102 further identifies repeating patterns within the mnemonic sequence(s) and filters out redundant patterns based on certain criteria. For example, the asset extraction system 102 generates a filtered pattern set and excludes from the set any patterns that are redundant (e.g., redundant within a mnemonic sequence and/or spatially redundant within a digital image). Additional detail regarding identifying and filtering repeating patterns is provided below with reference to subsequent figures.

Using the filtered pattern set, the asset extraction system 102 further determines pattern scores for the repeating patterns within the filtered pattern set. More specifically, the asset extraction system 102 determines pattern scores to identify geometric objects or groups of geometric objects to include within the set of reusable geometric assets 206. To determine pattern scores, the asset extraction system 102 determines certain metrics in relation to patterns within the filtered pattern set, such as frequency metric, visual saliency metrics, and geometric complexity metrics. Based on combinations of these metrics, the asset extraction system 102 generates or determines pattern scores for various repeating patterns and identifies those patterns to include within the set of reusable geometric assets 206. As shown, the set of reusable geometric assets 206 includes selectable options depicting geometric assets such as a calculator, a lamp, a trash bin, and a computer mouse to add to a digital image (e.g., the digital image 202). Additional detail regarding determining pattern scores and generating a set of reusable geometric assets is provided below with reference to subsequent figures.

The asset extraction system 102 provides the set of reusable geometric assets 206 within a graphical user interface (e.g., a digital image editing interface) as selectable icons or symbols. Based on user interaction selecting a reusable geometric asset, the asset extraction system 102 modifies a digital image (e.g., the digital image 202 or another digital image) by adding the selected reusable geometric asset to the digital image. In some embodiments, the asset extraction system 102 receives user interaction selecting a reusable geometric asset (already added) within the digital image 202 and receives further user interaction to modify the selected reusable geometric asset. In such embodiments, the asset extraction system 102 modifies all instances of the selected reusable geometric asset in the digital image 202 (e.g., modifies all calculators upon detecting modification of a portion of the calculator).

Figure 3:
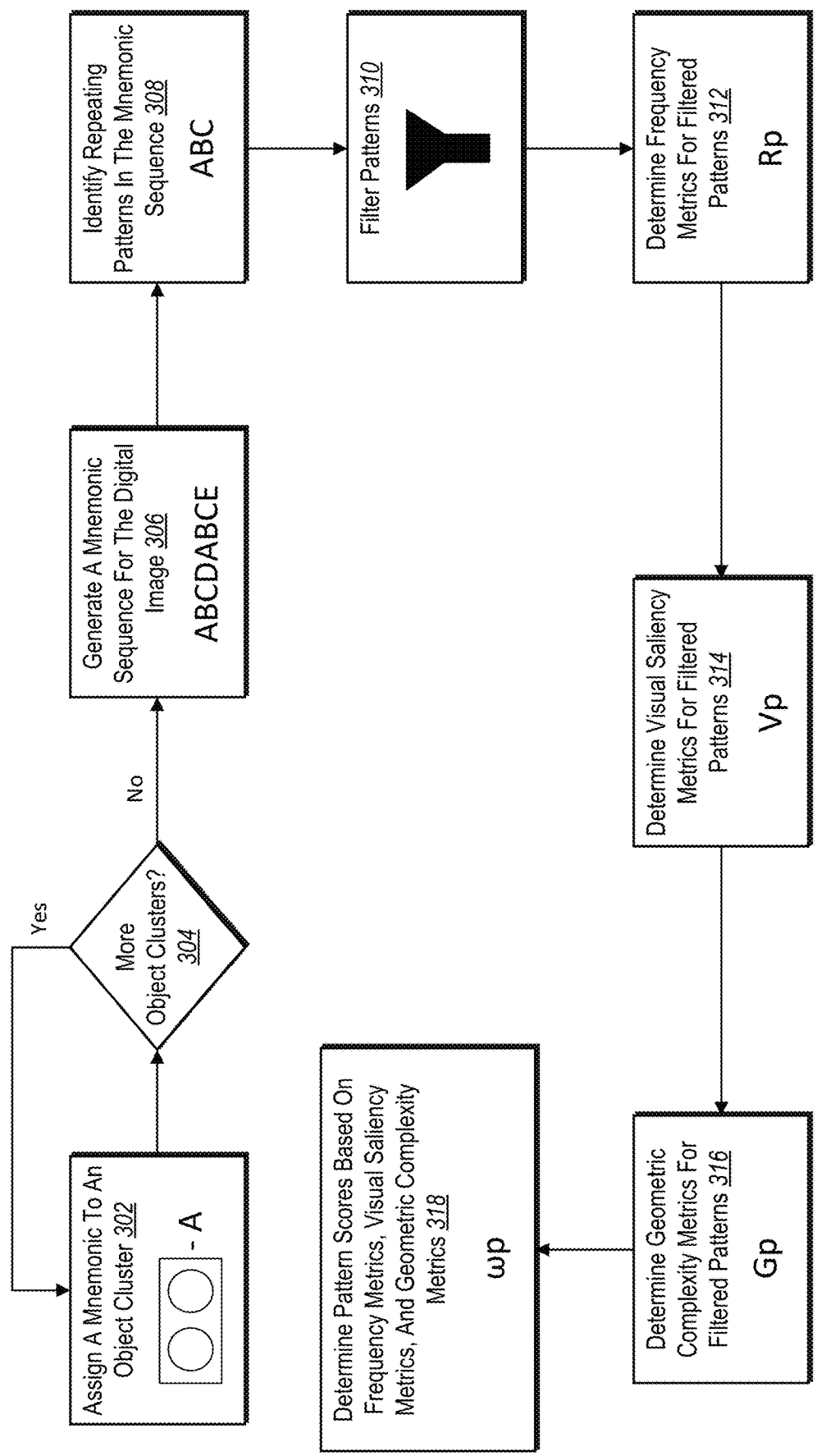
FIG. 3 illustrates a sequence of acts for determining pattern scores for patterns of objects in accordance with one or more embodiments.

As mentioned, the asset extraction system 102 can extract a set of reusable geometric assets from a digital image based on clustering geometric objects and analyzing mnemonics corresponding to object clusters. FIG. 3 illustrates a sequence of acts 302-318 that the asset extraction system 102 performs to generate a set of reusable geometric assets in accordance with one or more embodiments.

As illustrated in FIG. 3, the asset extraction system 102 performs an act 302 to assign a mnemonic to an object cluster. In particular, upon identifying geometric objects from a digital image (or a group of digital images) and grouping them into clusters, the asset extraction system 102 assigns mnemonics to the individual clusters. For instance, the asset extraction system 102 assigns a first mnemonic "A" to a first cluster of geometric objects. In addition, the asset extraction system 102 performs an act 304 to determine whether or not there are more object clusters associated with the digital image(s) (e.g., the digital image 202) which have not yet been assigned a mnemonic. Upon determining that there are more object clusters, the asset extraction system 102 repeats the acts 302 and 304 to assign mnemonics to object clusters (e.g., a second mnemonic "B" to a second object cluster) until no more unassigned clusters remain.

Upon determining that there are no more object clusters to assign a mnemonic, the asset extraction system 102 performs an act 306 to generate one or more mnemonic sequences for a digital image (or a group of digital images). Particularly, the asset extraction system 102 generates a mnemonic sequence (e.g., "ABCDABCE") that includes the mnemonics assigned to the clusters of the digital image(s). For example, the asset extraction system 102 appends mnemonics together in a particular order such as an order in which the objects occur within the digital image(s) (e.g., where adjacent mnemonics within a sequence correspond to adjacent geometric objects). Thus, the mnemonic sequence represents the geometric objects within the digital image(s), also reflecting their relationship or context in relation to one another.

As further illustrated in FIG. 3, the asset extraction system 102 performs an act 308 to identify repeating patterns within the mnemonic sequence. In particular, the asset extraction system 102 identifies maximal patterns by utilizing an enhance suffix array ("ESA"). For example, the asset extraction system 102 analyzes a mnemonic sequence using an index tree to identify a longest possible string of mnemonics that repeat within the sequence. As shown, the asset extraction system 102 identifies the maximal repeating pattern "ABC" from the mnemonic sequence "ABCDABCE."

In addition, the asset extraction system 102 identifies all non-overlapping occurrences (e.g., occurrences of a pattern where none of its mnemonics overlap or are included within another instance of the same pattern) of the maximal patterns using the index tree. Upon identifying the non-overlapping occurrences, the asset extraction system 102 determines numbers of repeat occurrences of each of the maximal patterns within a mnemonic sequence. In addition, the asset extraction system 102 excludes maximal patterns that have zero non-overlapping repeats within a mnemonic sequence from consideration for a filtered pattern set.

Indeed, as further shown in FIG. 2, the asset extraction system 102 performs an act 310 to filter patterns identified within a mnemonic sequence and thereby generate a filtered pattern set. More specifically, the asset extraction system 102 filters the identified patterns using a variety of algorithms. For example, the asset extraction system 102 implements an intra-pattern sequence analysis algorithm to identify and remove redundant patterns within a single pattern string. In addition, the asset extraction system 102 implements an inter-pattern sequence analysis algorithm to identify and remove redundant patterns via a joint analysis of multiple pattern strings together. Further, the asset extraction system 102 implements a spatial redundancy algorithm to identify and remove spatially redundant patterns. Additional detail regarding the algorithms for filtering patterns is provided below with reference to subsequent figures.

As shown, based on generating a filtered pattern set, the asset extraction system 102 further performs an act 312 to determine frequency metrics for filtered patterns. In particular, and as mentioned above, the asset extraction system 102 determines frequency metrics based on a repetition count (e.g., a number of total occurrences or a number of repeat occurrences after a first occurrence) of a pattern within a mnemonic sequence. In some embodiments, the asset extraction system 102 generates higher repetition counts for more significant geometric objects. Indeed, higher frequency of occurrence within a digital image can indicate a higher degree of significance within the digital image.

As further shown, the asset extraction system 102 also performs an act 314 to determine visual saliency metrics for filtered patterns within the filtered pattern set. The asset extraction system 102 determines visual saliency metrics based on respective areas occupied by a pattern (a group of objects corresponding to a pattern) within a digital image. To elaborate, the asset extraction system 102 determines a total area in pixels that all instances of a pattern take up within a digital image. For instance, the asset extraction system 102 identifies ten occurrences of a pattern and accumulates the total area for geometric objects corresponding to all ten occurrences. In some embodiments, the asset extraction system 102 determines larger values of visual saliency metrics for patterns with larger total areas, which can indicate a higher degree of significance within a digital image.

As illustrated in FIG. 3, the asset extraction system 102 further performs an act 316 to determine geometric complexity metrics for filtered patterns within a filtered pattern set. In particular, the asset extraction system 102 determines geometric complexity metrics for a given pattern based on a combination of the pattern's planar faces and planar edges. More specifically, the asset extraction system 102 identifies a set of planar faces and a set of planar edges for a geometric object. In one or more embodiments, the asset extraction system 102 combines the set of planar faces and the set of planar edges to determine geometric complexity metrics. For example, the asset extraction system 102 further determines a number of planar faces and a number of planar edges and combines the numbers for a cumulative geometric complexity metric. In some embodiments, the asset extraction system 102 determines larger values of geometric complexity metrics for geometric objects with more planar faces and/or more planar edges, which can indicate a higher degree of significance within a digital image (or a group of digital images).

As further illustrated in FIG. 3, the asset extraction system 102 performs an act 318 to determine pattern scores based on the frequency metrics, the visual saliency metrics, and the geometric complexity metrics. In particular, the asset extraction system 102 generates a weighted combination of the frequency metrics, the visual saliency metrics, and the geometric complexity metrics to determine a pattern score for a geometric object. In some embodiments, the asset extraction system 102 determines a frequency weight, a visual saliency weight, and a geometric complexity weight. The asset extraction system 102 further combines the frequency metrics, the visual saliency metrics, and the geometric complexity metrics utilizing the frequency weight, the visual saliency weight, and the geometric complexity weight to determine a pattern score. Additional detail regarding pattern ranking as well as the specific algorithms for generating frequency metrics, visual saliency metrics, and geometric complexity metrics is included below with reference to subsequent figures.

In at least one embodiment, the asset extraction system 102 performs a step for determining pattern scores for patterns among the one or more mnemonic sequences. Indeed, the description of the acts and algorithms of FIG. 3, along with the further detail regarding the acts and algorithms provided in subsequent figures, provides structure, algorithms, and acts for performing a step for determining pattern scores for patterns among the one or more mnemonic sequences.

In some embodiments, the asset extraction system 102 performs two or more of the acts 302-318 in parallel. For example, the asset extraction system 102 performs two or more of the acts 312-316 in parallel to determine the constituent metrics for generating a pattern score. In one or more embodiments, the asset extraction system 102 performs the acts 302-318 in parallel with respect to more than one digital image (e.g., in parallel for multiple digital images at once). For example, the asset extraction system 102 (parallelly) analyzes a repository or a library of digital images to generate a set of reusable geometric assets from the images within library and provides the set of reusable geometric assets for access by client devices (e.g., the client device 108).

In some embodiments, the asset extraction system 102 can also (or alternatively) extract reusable geometric assets for a portion of a digital image, as opposed to the entire digital image. For example, the asset extraction system 102 can receive a user selection of a portion of a digital image from which to extract reusable geometric assets. The asset extraction system 102 can analyze the user-selected portion via the acts 302-318 to determine pattern scores for a filtered pattern set of geometric objects within the user-selected portion. In addition (or alternatively), the asset extraction system 102 can extract reusable geometric assets for a particular layer (or set of layers) of a digital image. The asset extraction system 102 can further select reusable geometric assets based on the pattern scores.

Based on the determined pattern scores (as determined in the act 318), the asset extraction system 102 further identifies and/or selects patterns to include within a set of reusable geometric assets. More specifically, the asset extraction system 102 selects patterns of geometric objects (or selects patterns of mnemonics corresponding to patterns of geometric objects) whose scores satisfy a pattern score threshold to include within a set of reusable geometric assets. By selecting reusable geometric assets based on identifying geometric objects (or their corresponding mnemonics) that occur within particular patterns, the asset extraction system 102 can accurately distinguish between objects based on context. For example, the asset extraction system 102 can determine that one set of circles that make up a shadow in a particular location of a digital image are distinct from another set of circles that form some other shape in the image (because the two sets of circles occur within their own separate patterns).

As mentioned above, the asset extraction system 102 can generate geometric object clusters from geometric objects within a digital image. In particular, the asset extraction system 102 can identify geometric objects within a digital image and can group like objects together in clusters. FIG. 4 illustrates a representation of identified geometric objects and their respective grouping to object clusters in accordance with one or more embodiments.

As illustrated in FIG. 4, the asset extraction system 102 analyzes a digital image (e.g., the digital image 202) to identify geometric objects. In addition, the determines relationships between and/or context associated with the geometric objects within the digital image. For instance, the asset extraction system 102 determines a layer hierarchy such as a z-order of geometric objects as they occur within the digital image. Indeed, the asset extraction system 102 determines a z-order arrangement 402 of the geometric objects within a digital image.

Additionally, the asset extraction system 102 analyzes the identified geometric objects to compare them with one another. Particularly, the asset extraction system 102 compares geometric objects to determine relationships such as affine similarities between them. In some embodiments, the asset extraction system 102 further performs affine transformations of geometric objects and compares the transformations with identified geometric objects to thereby identify affine variants of geometric objects that occur within the digital image. For instance, the asset extraction system 102 performs one or more of a rotation, a scaling, or a translation to a geometric object and compares the transformation to other geometric objects.

Based on the comparison, the asset extraction system 102 utilizes a clustering algorithm (e.g., the clustering algorithm described by Sumit Dhingra et al.) to group the geometric objects into geometric object clusters 404-412. For example, the asset extraction system 102 determines similarity scores between geometric objects and groups them according to similarity scores. As shown in FIG. 4, the asset extraction system 102 generates geometric object clusters 404-412 that include objects and affine variants of the objects. For instance, the asset extraction system 102 generates the cluster 404 that includes two circles, the cluster 406 that includes a square and a rotated square, the cluster 408 that includes a triangle and a rotated triangle, the cluster 410 that includes a pentagon, and the cluster 412 that includes an octagon.

As shown in FIG. 4, the asset extraction system 102 can assign mnemonics to the clusters 404-408. As illustrated, the asset extraction system assigns an "A" mnemonic label to the cluster 404, a "B" mnemonic label to the cluster 406, a "C" mnemonic label to the cluster 408, a "D" mnemonic label to the cluster 410, and an "E" mnemonic label to the cluster 412.

Figure 5A:
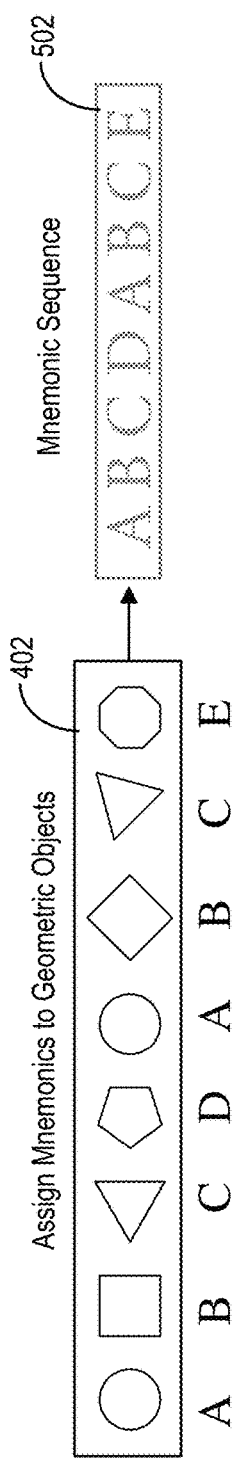
FIGS. 5A-5B illustrate assigning mnemonics to object clusters and identifying patterns within mnemonic sequences in accordance with one or more embodiments.

As mentioned, the asset extraction system 102 can generate a mnemonic sequence to represent geometric objects within a digital image. In particular, the asset extraction system 102 can assign mnemonics to individual geometric object clusters (e.g., the geometric object clusters 404-412) and can generate a mnemonic sequence from those mnemonics. FIG. 5A illustrates generating a mnemonic sequence 502 from the z-order arrangement 402 of geometric objects in accordance with one or more embodiments.

As shown, the asset extraction system 102 generate the mnemonic sequence 502 to include the mnemonics of the geometric object clusters 404-412 and to thus represent the geometric objects within the digital image. Indeed, as just discussed, the asset extraction system 102 assigns mnemonics to the geometric object clusters 404-412. For instance, as illustrated in FIG. 4 and FIG. 5A, the asset extraction system 102 selects alphanumeric characters to use as mnemonics to assign to the geometric object clusters 404-412. As shown, the asset extraction system 102 assigns "A" to the circle cluster (404), "B" to the square cluster (406), "C" to the triangle cluster (408), "D" to the pentagon cluster (410), and "E" to the octagon cluster (412).

Further, the asset extraction system 102 generates the mnemonic sequence 502 to have a particular order reflecting the arrangement of geometric objects within the digital image. Indeed, the asset extraction system 102 generates the mnemonic sequence 502 based on layer hierarchy of the digital image. For example, the asset extraction system 102 appends the mnemonics of the geometric object clusters 404-412 in the z-order of the geometric objects. As shown, the asset extraction system 102 generates the mnemonic sequence 502 of "ABCDABCE" from the z-order arrangement 402.

Figure 5B:
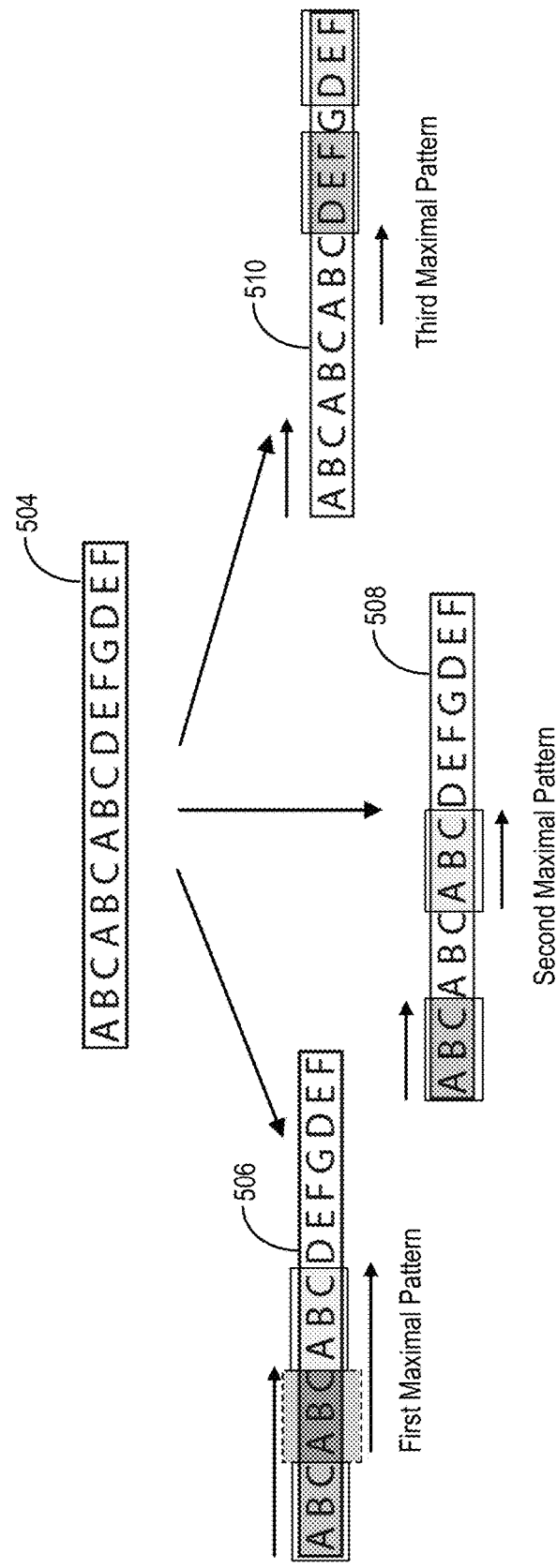

From a generated mnemonic sequence (e.g., the mnemonic sequence 502), the asset extraction system 102 can identify repeating patterns of mnemonics. In particular, the asset extraction system 102 can identify non-overlapping repeat occurrences of patterns within a mnemonic sequence. FIG. 5B illustrates identifying repeating maximal patterns from a mnemonic sequence in accordance with one or more embodiments.

As illustrated in FIG. 5B, the asset extraction system 102 analyzes a mnemonic sequence 504 to identify a first maximal pattern 506, a second maximal pattern 508, and a third maximal pattern 510. For ease of illustration and description, the mnemonic sequence 504 is different than the mnemonic sequence 502. However, the asset extraction system 102 can generate the mnemonic sequence 504 in the same manner discussed above with respect to the mnemonic sequence 502.

As illustrated, the asset extraction system 102 analyzes the mnemonic sequence 504 in a left-to-right order to identify patterns, following the z-order of the geometric objects within the digital image. The asset extraction system 102 can utilize a variety of computer-implemented algorithms or models to identify patterns. In one or more embodiments, the asset extraction system 102 analyzes the mnemonic sequence 504 utilizing an efficient sequence analysis technique ("ESA") to generate a maximal pattern set Σ of all maximal repeating patterns within the mnemonic sequence 504. For example, to generate the maximal pattern set Σ, the asset extraction system 102 can implement the ESA techniques described by Knut Reinert, Temesgen Hailemariam Dadi, Marcel Ehrhardt, Hannes Hauswedell, Svenja Mehringer, Ren'e Rahn, Jongkyu Kim, Christopher Pockrandt, J"org Winkler, Enrico Siragusa, Gianvito Urgese, and Dave Weese in The Seqan C++ Template Library for Efficient Sequence Analysis: A Resource for Programmers, Journal of Biotechnology 261, 157-68 (November 2017), which is incorporated herein by reference in its entirety.

In addition, the asset extraction system 102 can identify all non-overlapping occurrences of the maximal patterns within the maximal pattern set Σ using the index tree described by Knut Reinert et al. Indeed, the asset extraction system 102 can analyze the mnemonic sequence 504 to identify the number of repeat occurrences of each repeating maximal pattern. Based on the numbers of repeat occurrences, the asset extraction system 102 further removes or excludes patterns which have zero non-overlapping repeats from the maximal pattern set Σ. As illustrated in FIG. 5B, for instance, the asset extraction system 102 identifies three maximal repeating patterns (506-510), but the first maximal pattern 506 ("ABCABC") does not have any non-overlapping repeat occurrences within the mnemonic sequence 504. The asset extraction system 102 therefore removes the first maximal pattern 506 from the maximal pattern set Σ and includes only the second maximal pattern 508 and the third maximal pattern 510 ("ABC" and "DEF," respectively).

Figure 6A:
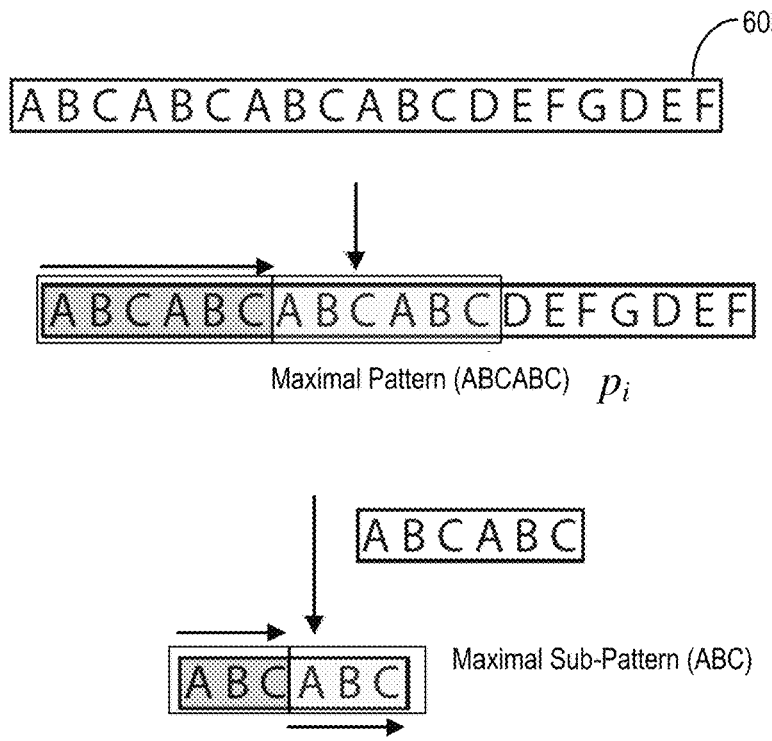
FIGS. 6A-6B illustrate filtering out redundant patterns in accordance with one or more embodiments.
Figure 6B:
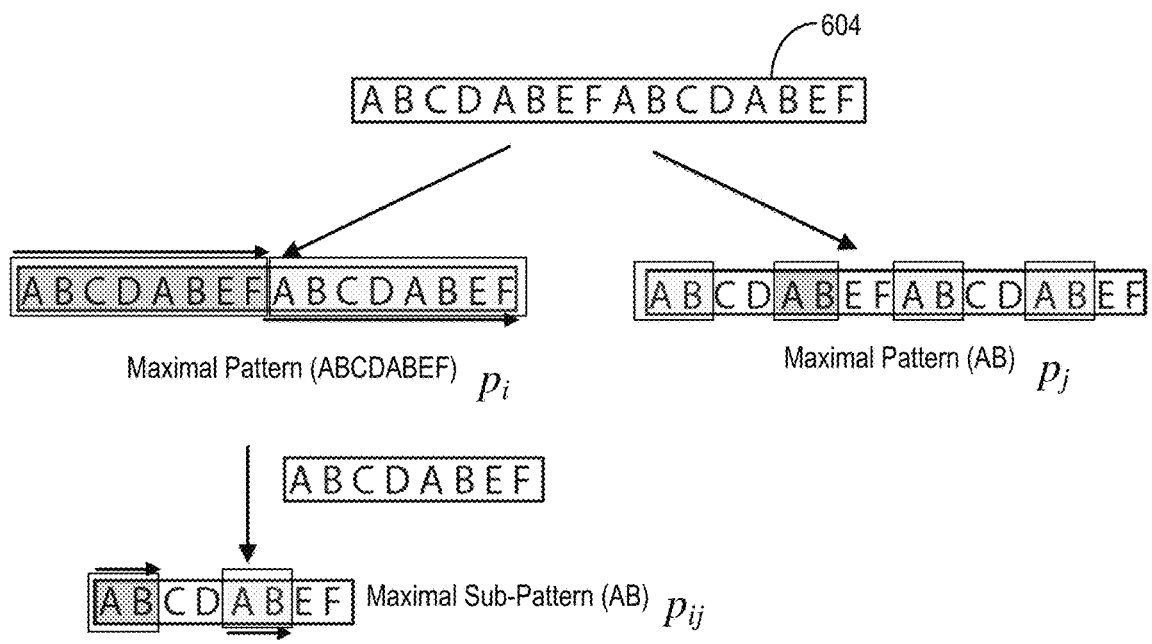

As mentioned above, the asset extraction system 102 can filter out patterns to generate a filtered pattern set from which to select reusable geometric assets. In particular, the asset extraction system 102 can filter patterns from the maximal pattern set Σ to generate a filtered pattern set of maximal repeating patterns that have not been filtered out. FIGS. 6A-6B illustrate filtering out patterns from the maximal pattern set Σ to generate a filtered pattern set based on an intra-pattern sequence analysis in accordance with one or more embodiments. To determine redundancy of particular patterns by comparing patterns with one another, the asset extraction system 102 determines various pattern attributes associated with patterns within a mnemonic sequence. For example, the asset extraction system 102 determines attributes such as a repeat count, a length, and an occurrence index (e.g., a starting position of a pattern within a mnemonic sequence) for each pattern. The asset extraction system 102 further utilizes these attributes to determine redundancy of patterns.

For instance, as illustrated in FIG. 6A, the asset extraction system 102 determines whether a given pattern within the mnemonic sequence 602 is composed entirely of a single sub-pattern. Thus, the asset extraction system 102 prevents two instances of the same asset or group of objects from being combined and identified as a single asset, but rather identifies them separately (e.g., two glasses are separate assets in an image and not a single asset). Indeed, as shown, the asset extraction system 102 identifies the pattern "ABCABC" as redundant because it is composed entirely of the sub-pattern "ABC." The asset extraction system 102 therefore filters out the pattern "ABCABC" and excludes the pattern from a filtered pattern set (e.g., by removing the pattern from the maximal pattern set Σ).

To elaborate, the asset extraction system 102 analyzes the mnemonic sequence 602 to identify non-overlapping maximal patterns (e.g., the pattern "ABCABC"). The asset extraction system 102 determines whether one pattern overlaps with another pattern based on an occurrence index and/or a length of each pattern. The asset extraction system 102 further analyzes the non-overlapping maximal patterns to identify non-overlapping maximal sub-patterns within them. For example, the asset extraction system 102 identifies non-overlapping maximal sub-patterns (and does so only once per pattern) and determines a repeat count and a length of the non-overlapping maximal sub-patterns. To elaborate, the asset extraction system 102 determines the length (e.g., the cumulative length of all instances) of the $j^{th}$ sub-pattern $p_{ij}$ within a set of non-overlapping maximal sub-patterns $\Sigma_i$ of the pattern $p_i$ (e.g., the pattern "ABCABC"), as given by:

$$lc_{ij}=(c_{ij}*l_{ij})$$

where $lc_{ij}$ represents the length covered by the $j^{th}$ sub-pattern $p_{ij}$ (e.g., the sub-pattern "ABC") within the set of non-overlapping maximal sub-patterns $\Sigma_i$, and where $c_{ij}$ is the repeat count of the $j^{th}$ sub-pattern, and $l_{ij}$ is the length of a single instance of the $j^{th}$ sub-pattern. As shown in FIG. 6A, the asset extraction system 102 determines a length of the sub-pattern "ABC" as 3 (within the pattern "ABCABC" with a length of 6).

The asset extraction system 102 can utilize this length to identify redundant patterns. For instance, the asset extraction system 102 compares lengths of sub-patterns with lengths of the patterns from which they are identified (e.g., comparing the length of "ABC" with the length of "ABCABC"). If the length of a sub-pattern $p_{ij}$ (the $j^{th}$ sub-pattern of the pattern $p_i$) is at or above a particular threshold percentage or threshold proportion of the length of the pattern $p_i$ from which it was identified, then the asset extraction system 102 determines that the pattern $p_i$ is redundant. For example, if $lc_{ij}$ (e.g., the cumulative length of "ABC") is at or above a threshold percentage (e.g., 75%) of $l_i$ (e.g., the length of "ABCABC"), then the asset extraction system 102 identifies $p_i$ (e.g., "ABCABC") as redundant.

As illustrated in FIG. 6B, the asset extraction system 102 determines whether a given pattern within the mnemonic sequence 604 repeats only within a larger non-redundant pattern. Thus, the asset extraction system 102 prevents different constituent parts of an asset or group of objects from being identified as separate assets (e.g., legs of a chair are part of the chair and not their own assets). As shown, the asset extraction system 102 identifies the pattern "AB" as redundant because it repeats only inside the larger pattern "ABCDABEF." More specifically, the asset extraction system 102 determines if a $j^{th}$ sub-pattern $p_{ij}$ (e.g., the sub-pattern "AB" in FIG. 6B) of the set of non-overlapping maximal sub-patterns $\Sigma_i$ matches a pattern $p_j$ (e.g., the pattern "AB" in FIG. 6B) within the maximal pattern set $\Sigma$. Additionally, if the repeat count of the pattern $p_j$ is equal to the repeat count of the sub-pattern $p_{ij}$ combined with the repeat count of the pattern $p_i$ from which the sub-pattern pattern $p_{ij}$ is identified, then the asset extraction system 102 identifies the sub-pattern as redundant. That is, the asset extraction system 102 determines that the pattern $p_j$ ("AB") is redundant if it matches the sub-pattern pattern $p_{ij}$ and if:

$$c_j=c_i*c_{ij}$$

where $c_j$ is the repeat count of the pattern $p_j$, $c_i$ is the repeat count of the pattern $p_i$, and $c_{ij}$ is the repeat count of the sub-pattern $p_{ij}$. The asset extraction system 102 thus excludes the pattern $p_j$ from a filtered pattern set because it is redundant (by removing the pattern $p_j$ from the maximal pattern set $\Sigma$).

As mentioned, the asset extraction system 102 can not only remove redundant patterns using an intra-pattern sequence analysis but can also remove redundant patterns using an inter-pattern sequence analysis. In particular the asset extraction system 102 can remove redundant patterns from the maximal pattern set $\Sigma$ based on redundancy with respect to an analysis of multiple patterns together. Looking again to FIG. 6B, the asset extraction system 102 analyzes the $i^{th}$ and $j^{th}$ patterns together. The asset extraction system 102 determines that the two patterns $p_i$ ("ABCDABEF") and $p_j$ ("AB") are redundant with respect to each other if they satisfy certain criteria.

For example, the asset extraction system 102 determines whether one pattern $p_i$ is contained inside the other pattern $p_j$ (e.g., the pattern $p_i$ is a sub-pattern within $p_j$). In addition, the asset extraction system 102 determines repeat counts of the patterns $p_i$ and $p_j$. The asset extraction system 102 can compare the repeat counts of these patterns to determine if one of the patterns is redundant. For example, if the repeat counts are the same (e.g., $c_i=c_j$), then the asset extraction system 102 identifies the pattern $p_i$ as redundant and filters the pattern $p_i$ out. If the repeat counts are different, however, the asset extraction system 102 determines respective weights for each of the patterns $p_i$ and $p_j$. For instance, the asset extraction system 102 determines a weight of a pattern $p_i$ in accordance with:

$$w_i=(c_i*l_i)$$

where $w_i$ is the weight of the pattern $p_i$, $c_i$ is the repeat count of the pattern $p_i$, and $l_i$ is the length of an instance of the pattern $p_i$. The asset extraction system 102 determines the weight for the pattern $p_j$ in a similar fashion. The asset extraction system 102 further compares the weights of the patterns $p_i$ and $p_j$. If the asset extraction system 102 determines that the weight of the pattern $p_i$ is larger than the weight of the pattern $p_j$ (i.e., $w_i>w_j$), then the asset extraction system 102 determines that the pattern $p_j$ is redundant (if $p_i$ is also contained inside $p_j$). If the asset extraction system 102 determines that the weight of the pattern $p_i$ is not larger than the weight of the pattern $p_j$ (and $p_i$ is contained inside $p_j$), then the asset extraction system 102 determines that the pattern $p_i$ is redundant.

Figure 7:
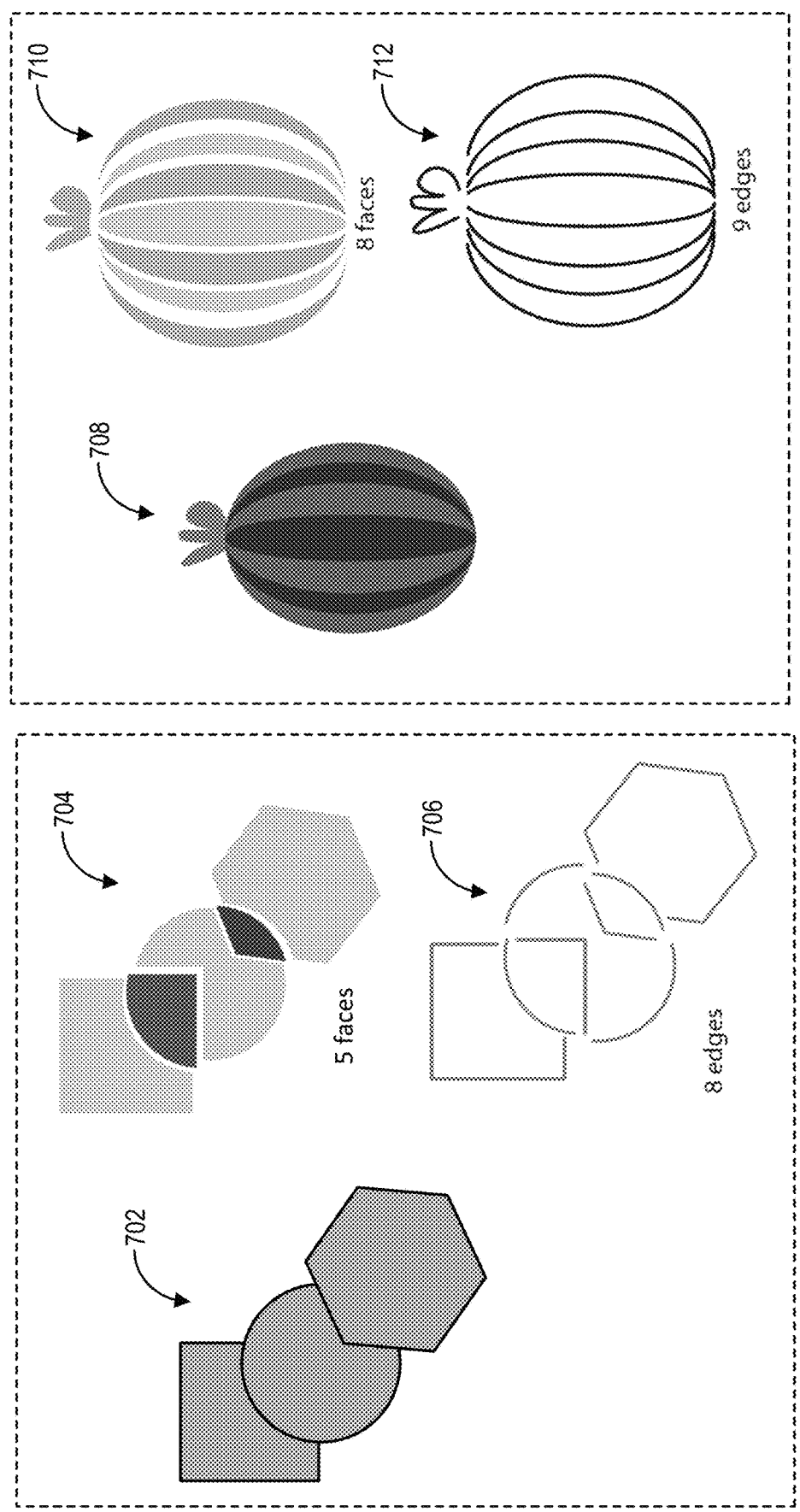
FIG. 7 illustrates determining planar arrangements for patterns in accordance with one or more embodiments.
Figure 8:
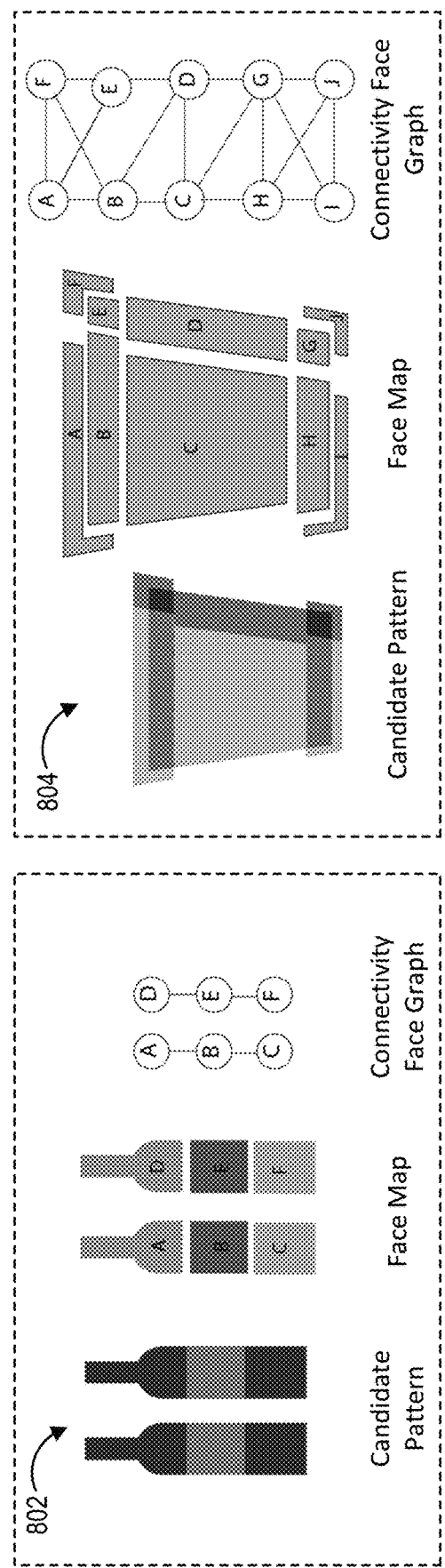
FIG. 8 illustrates identifying disjoint objects in accordance with one or more embodiments.

As mentioned, the asset extraction system 102 can filter out patterns based on spatial redundancy within a digital image as well as the above-describe inter-pattern and intra-pattern analysis techniques. In particular, the asset extraction system 102 can analyze the geometry of geometric objects within a pattern to determine whether the pattern is redundant (and thus exclude the redundant patterns from a filtered pattern set). FIGS. 7-8 illustrate filtering out patterns from the maximal pattern set $\Sigma$ to generate a filtered pattern set based on a spatial information analysis in accordance with one or more embodiments. Indeed, the asset extraction system 102 determines that a pattern is spatially redundant if the pattern contains disjoint objects (e.g., geometric objects which are not connected or linked to each other) and/or if the pattern has trivial geometry (e.g., a geometric complexity that fail to satisfy a geometric complexity threshold).

As shown in FIG. 7, the asset extraction system 102 determines a planar arrangement of geometric objects in a given object pattern 702, including a set of planar faces 704 and a set of planar edges 706. Indeed, the asset extraction system 102 identifies 5 planar faces and 8 planar edges for the object pattern 702. As another example, the asset extraction system 102 determines a planar arrangement for the object pattern 708, including a set of planar faces 710 and a set of planar edges 712. As shown, the asset extraction system 102 identifies 8 planar faces and 9 planar edges for the object pattern 708.

To generate a planar arrangement (including a set of planar faces and a set of planar edges) like those illustrated in FIG. 7, the asset extraction system 102 generates a planar map for a pattern of objects (e.g., the object pattern 702 or 708) and identifies planar faces and edges from the planar map. The asset extraction system 102 can utilize a variety of computer-implemented algorithms or models to identify faces and edges. For example, the asset extraction system 102 can utilize the planar arrangement techniques described by Paul Asente, Mike Schuster, and Teri Pettit in *Dynamic Planar Map Illustration*, ACM SIGGRAPH 2007 Papers, 30 (2007), which is incorporated herein by reference in its entirety.

Based on identifying the planar faces and the planar edges, the asset extraction system 102 determines geometric complexity for an object pattern (e.g., the object pattern 702 or 708). In particular, the asset extraction system 102 determines a primitive count of faces and edges for an object pattern. For instance, the asset extraction system 102 determines a geometric complexity for an object pattern, as given by:

$$GC = (|F| + |E|)$$

where GC represents a measure of geometric complexity, |F| represents a number of planar faces within a pattern, and E represents a number of planar edges within the pattern.

To determine whether a pattern has trivial geometry, the asset extraction system 102 determines a geometric complexity threshold specific to a given digital image (or a specific group of digital images). Particularly, the asset extraction system 102 determines a median (or an average) of a geometric complexity values GC for all patterns within the digital image (e.g., the digital image 202) and generates a geometric complexity threshold based on the median (or the average). For instance, the asset extraction system 102 determines a certain percentage (e.g., 10%) of the median GC value as a geometric complexity threshold. Thus, the asset extraction system 102 identifies a pattern whose geometric complexity is lower than the geometric complexity threshold as a (geometrically) trivial pattern. In some embodiments, the asset extraction system 102 excludes the trivial pattern from a filtered pattern set.

The asset extraction system 102 can utilize a variety of different geometric complexity thresholds. For instance, in some embodiments, the asset extraction system 102 determines a geometric complexity threshold as a minimum number (e.g., 3, 5, 10, or 20) of planar faces and/or planar edges of a pattern. The asset extraction system 102 can also determine a geometric complexity threshold as a threshold percentage (e.g., 0.5% or 1%) of the total geometric complexity of a digital image (e.g., a cumulative number of faces and/or edges of the digital image).

In addition to determining whether or not a pattern is trivial, the asset extraction system 102 can determine whether a pattern includes disjoint objects. In particular, the asset extraction system 102 can analyze the planar map of a pattern to determine whether the pattern includes any disjoint objects. FIG. 8 illustrates determining disjoint objects for patterns in accordance with one or more embodiments.

The asset extraction system 102 can utilize a variety of computer-implemented acts or algorithms to identify disjoint objects. For example, in some embodiments, the asset extraction system 102 utilizes depth-first search ("DFS") traversal and/or breadth-first search ("BFS") traversal over a graph of planar faces F of a pattern. The asset extraction system 102 identifies an edge between two faces if the faces are adjacent to one another in the planar map. If a planar arrangement contains at least two faces which the asset extraction system 102 cannot traverse using the edge graph, the asset extraction system 102 determines that these two faces are disjoint. Additionally, the asset extraction system 102 excludes or removes the pattern that contains the disjoint objects from a filtered pattern set.

As illustrated in FIG. 8, the asset extraction system 102 analyzes the pattern 802 to generate the corresponding face map and the corresponding connectivity face graph. As shown, the asset extraction system 102 determines that the pattern 802 contains disjoint objects because the connectivity face graph shows no connection between the ABC objects and the DEF objects. The asset extraction system 102 therefore excludes the pattern 802 from a filtered pattern set.

In addition, the asset extraction system 102 analyzes the pattern 804 to generate the corresponding face map and the corresponding connectivity face graph. As shown, the asset extraction system 102 determines that the pattern 804 does not include any disjoint objects because the connectivity face graph indicates connections between the objects ABCDEFGHIJ. The asset extraction system 102 therefore includes the pattern 804 within a filtered pattern set.

Figure 9:
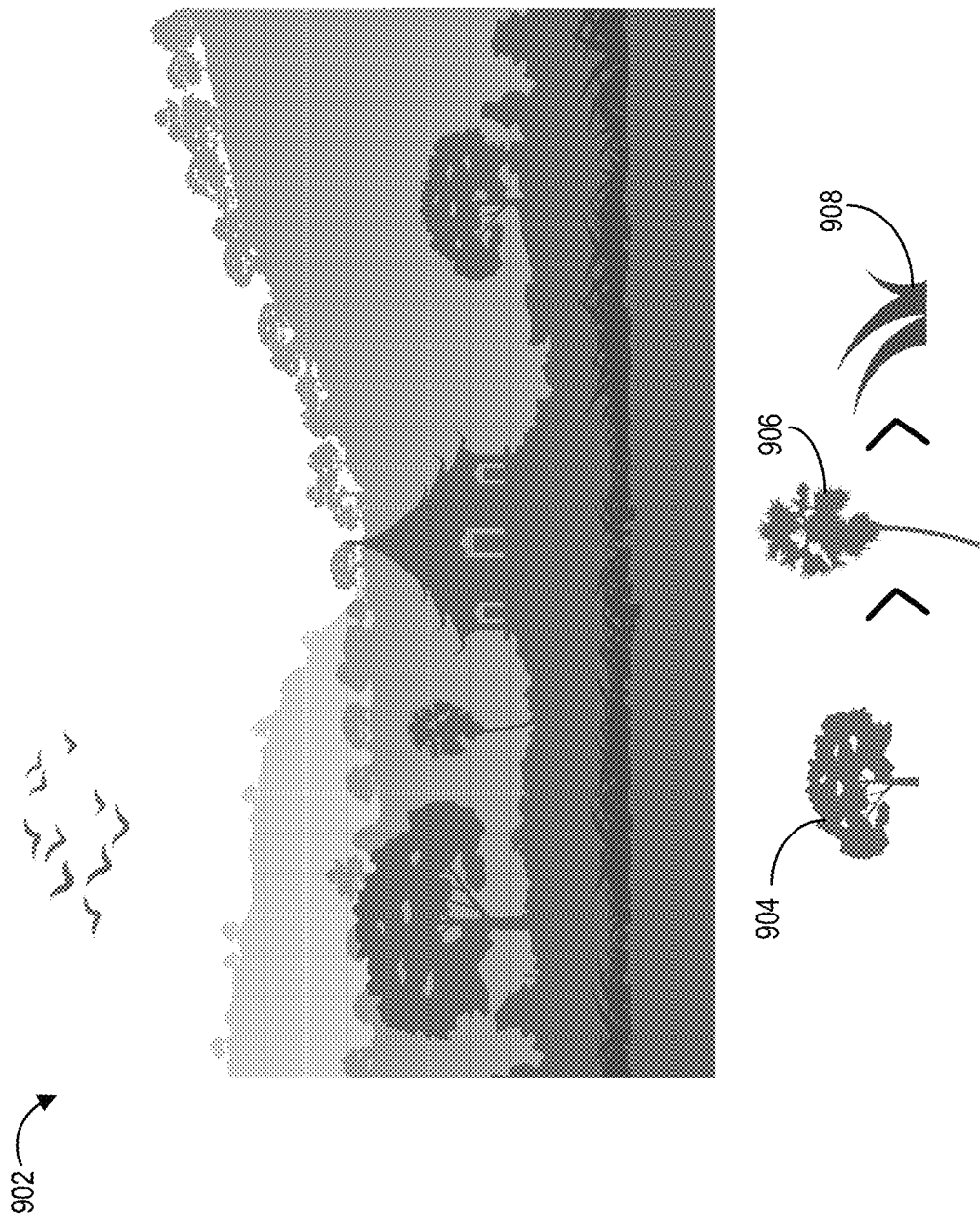
FIG. 9 illustrates ranking geometric objects based on pattern scores in accordance with one or more embodiments.

As mentioned above, the asset extraction system 102 can generate pattern scores for patterns within a filtered pattern set. Indeed, the asset extraction system 102 can generate a filtered pattern set in accordance with the above description for identifying and filtering patterns. The asset extraction system 102 can generate pattern scores for patterns within a filtered pattern set based on one or more of frequency metrics, visual saliency metrics, and/or geometric complexity metrics. FIG. 9 illustrates ranking patterns 904-908 identified from a digital image 902 based on their respective pattern scores in accordance with one or more embodiments.

The asset extraction system 102 determines frequency metrics as part of a pattern score. More specifically, the asset extraction system 102 determines a repeat count of a pattern within a mnemonic sequence or within a digital image. For example, the asset extraction system 102 determines a frequency metric for a given pattern in accordance with:

$$R_p = C_p$$

where $R_p$ represents the frequency metric of a pattern p and $C_p$ represents the repeat count of the pattern p.

In addition, the asset extraction system 102 determines visual saliency metrics as part of a pattern score. In particular, the asset extraction system 102 determines visual saliency of a pattern by determining an area that the pattern occupies within a digital image. In some embodiments, the asset extraction system 102 determines visual saliency of a single instance of a pattern by accumulating the area (in pixels) of all of the faces within the planar arrangement of the pattern. Additionally, the asset extraction system 102 determines a total area for all instances of a pattern by combining the areas for each instance. For example, the asset extraction system 102 determines a visual saliency metric for a given pattern in accordance with:

$$V_p = \left( \sum_{i=1}^{C_p} \sum_{i=1}^{|F|} Area_{F_i} \right)$$

where $V_p$ represents the visual saliency metric of a pattern p, $C_p$ represents the repeat count of the pattern p, |F| represents the number of faces within the planar arrangement of the pattern p, and $Area_{F_i}$ is the pixel area occupied or covered (within a digital image or a group of digital images) by the $i^{th}$ face of the planar arrangement.

Because, different instances of a pattern can be affine transformations of a given base pattern, the asset extraction system 102 can additionally (or alternatively) determine visual saliency metrics given by:

$$V_p = \left( \sum_{i=1}^{C_p} \frac{S_{x_i} + S_{y_i}}{2} * A_b \right)$$

where $S_{x_i}$ and $S_{y_i}$ are scales of the $i^{th}$ occurrence of the pattern p along the x and y directions, respectively, and where $A_b$ is the area of a base pattern from which affine transformations are determined.

Further, the asset extraction system 102 determines geometric complexity metrics as part of a pattern score. In particular, the asset extraction system 102 determines a geometric complexity metric for a pattern p in accordance with:

$$G_p = GC$$

where $G_p$ is the geometric complexity metric of the pattern p and GC is the geometric complexity as determined via a primitive count of a combination of planar faces and planar edges of a pattern, as described above in relation to FIG. 7.

Although the foregoing establishes one approach to determining geometric complexity, the asset extraction system 102 can utilize other approaches to determine geometric complexity. For example, the asset extraction system 102 can determines geometric complexity for a pattern based on a number of geometric objects (or mnemonics) that are within the pattern. For example, a pattern with more geometric objects may be have a higher geometric complexity metric than a pattern with fewer geometric objects.

As mentioned, the asset extraction system 102 determines pattern scores based on one or more of the frequency metrics, the visual saliency metrics, and the geometric complexity metrics. In particular, the asset extraction system 102 generates a weighted combination (e.g., a weighted linear combination) of the different metrics to generate a pattern score for a given pattern. For example, the asset extraction system 102 determines a frequency weight, a visual saliency weight, and a geometric complexity weight for generating a pattern score. In some embodiments, the asset extraction system 102 generates a pattern score for a pattern p in accordance with:

$$\omega_p = (w_R * R_p + w_G * G_p + w_V * V_p)$$

where $\omega_p$ represents the pattern score for the pattern p, $w_R$ represents the frequency weight, $w_G$ represents the geometric complexity weight, $w_V$ represents the visual saliency weight, and $R_p$, $G_p$, and $V_p$ are defined above. In some embodiments, the asset extraction system 102 utilizes default values for $w_R$, $w_G$, and $w_V$, while in other embodiments the asset extraction system 102 determines the weight values based on analyzing a digital image (or as indicated by a user via user input).

As shown in FIG. 9, the asset extraction system 102 can further rank patterns within a digital image based on their respective pattern scores. Indeed, as shown, the asset extraction system 102 determines pattern scores for the patterns 904-908 identified within the digital image 902. The asset extraction system 102 further ranks the patterns 904-908, indicating that the pattern 904 has the highest pattern score, the pattern 908 has the lowest pattern score, and the pattern 906 is in between the two.

The asset extraction system 102 further selects patterns from a mnemonic sequence and/or from a digital image (e.g., from the digital image 202 or 902) based on the pattern scores and/or the ranking. For instance, the asset extraction system 102 selects patterns with pattern scores that satisfy a threshold pattern score as reusable geometric assets to include within a set of reusable geometric assets. In some embodiments, the asset extraction system 102 selects only the top-ranked pattern (or a number of patterns in the ranking from the top down) to include within a set of reusable geometric assets.

Additionally, the asset extraction system 102 generates or modifies a graphical user interface to provide the set of reusable geometric assets for display on a client device (e.g., the client device 108). In some embodiments, the asset extraction system 102 provides the reusable geometric assets for display in order of their pattern scores and/or ranking, with higher scored/ranked reusable geometric assets presented first within a reusable geometric asset window. Based on user interaction to select a reusable geometric asset represented by a selectable symbol or icon, the asset extraction system 102 generates a modified digital image to include the reusable geometric asset.

In one or more embodiments, the asset extraction system 102 modifies assets within a digital image. For example, the asset extraction system 102 receives user interaction selecting and editing a particular asset within a digital image. Based on the user interaction, the asset extraction system 102 automatically identifies all (or a set of) assets within the digital image that match the selected asset and modifies them uniformly to match the edit of the selected asset.

Figure 10:
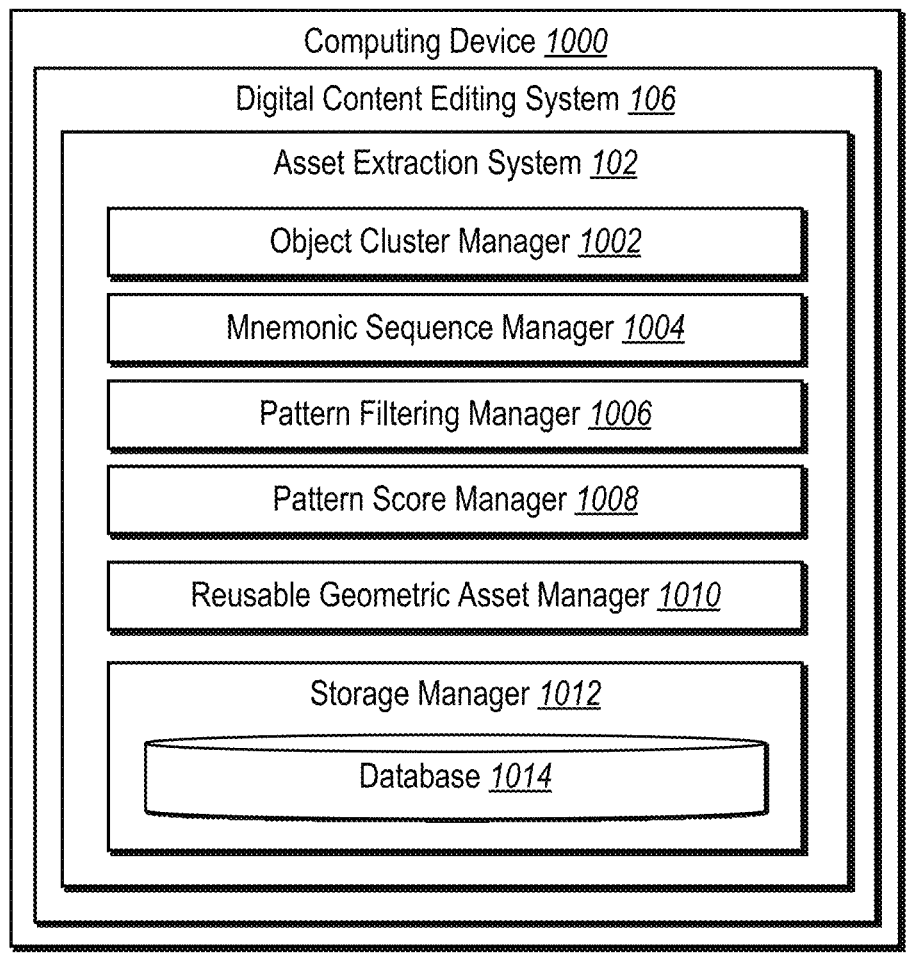
FIG. 10 illustrates a schematic diagram of an asset extraction system in accordance with one or more embodiments.

Looking now to FIG. 10, additional detail will be provided regarding components and capabilities of the asset extraction system 102. Specifically, FIG. 10 illustrates an example schematic diagram of the asset extraction system 102 on an example computing device 1000 (e.g., one or more of the client device 108 and/or the server(s) 104). As shown in FIG. 10, the asset extraction system 102 may include an object cluster manager 1002, a mnemonic sequence manager 1004, a pattern filtering manager 1006, a pattern score manager 1008, a reusable geometric asset manager 1010, and a storage manager 1012. The storage manager 1012 can operate in conjunction with or include one or more memory devices such as the database 1014 (e.g., the database 114) that store various data such as algorithms for identifying and filtering patterns within mnemonic sequences as well as a digital image that includes a plurality of geometric objects.

As just mentioned, the asset extraction system 102 includes an object cluster manager 1002. In particular, the object cluster manager 1002 manages, maintains, determines, detects, or identifies geometric objects within a digital image (or a group of digital images). For example, the object cluster manager 1002 analyzes a digital image to identify vector geometries and utilizes a clustering algorithm to group the vector geometries into clusters. As described above, the object cluster manager 1002 clusters the geometric objects based on affine similarity so that each cluster includes geometric objects and their affine transformations.

As shown, the asset extraction system 102 also includes a mnemonic sequence manager 1004. In particular, the mnemonic sequence manager 1004 manages, maintains, determines, assigns, generates, or identifies one or more mnemonic sequences for a digital image (or a group of digital images). For example, the mnemonic sequence manager 1004 assigns mnemonics to object clusters for a digital image and appends the mnemonics together in z-order to generate a mnemonic sequence that represents the geometric objects within a digital image.

The asset extraction system 102 further includes a pattern filtering manager 1006. In particular, the pattern filtering manager 1006 manages, determines, identifies, filters, removes, and/or excludes patterns within a mnemonic sequence and/or a digital image. For example, the pattern filtering manager 1006 identifies repeating patterns within a mnemonic sequence. The pattern filtering manager 1006 further generates a filtered pattern set by removing or excluding redundant patterns as described above.

As illustrated in FIG. 10, the asset extraction system 102 also includes a pattern score manager 1008. In particular, the pattern score manager 1008 manages, maintains, determines, or generates pattern scores for repeating patterns within a filtered pattern set. For example, the pattern score manager 1008 determines metrics such as frequency metrics, visual saliency metrics, and geometric complexity metrics for patterns within a filtered pattern set. In addition, the pattern score manager 1008 generates pattern scores as weighted combinations of the frequency metrics, visual saliency metrics, and the geometric complexity metrics. In some embodiments, the pattern score manager 1008 ranks patterns based on their pattern scores, as described herein.

The asset extraction system 102 further includes a reusable geometric asset manager 1010. In particular, the reusable geometric asset manager 1010 manages, maintains, identifies, determines, generates, or extracts reusable geometric assets from a filtered pattern set. For example, the reusable geometric asset manager 1010 generates a set of reusable geometric assets by selecting patterns from a filtered pattern set based on their pattern scores (or ranking). The reusable geometric asset manager 1010 further provides selectable icons for the set of reusable geometric assets for display on a client device for a user to interact and add the reusable geometric assets to a digital image. The reusable geometric asset manager 1010 further communicates with the storage manager 1012 to store the set of reusable geometric assets within the database 1014 (e.g., within a library of reusable geometric assets) for use in other projects and/or in relation to other digital images.

The asset extraction system 102 further includes a storage manager 1012. The storage manager 1012 (e.g. via a non-transitory computer memory/one or more memory devices) can store and maintain data associated with managing digital images and corresponding assets. For example, the storage manager 1012 can maintain a database 1014 that includes digital images, geometric objects, geometric assets, patterns, pattern scores, or various pattern metrics (e.g., visual saliency metrics, geometric complexity metrics, or frequency metrics).

In one or more embodiments, each of the components of the asset extraction system 102 are in communication with one another using any suitable communication technologies. Additionally, the components of the asset extraction system 102 can be in communication with one or more other devices including one or more client devices described above. It will be recognized that although the components of the asset extraction system 102 are shown to be separate in FIG. 10, any of the subcomponents may be combined into fewer components, such as into a single component, or divided into more components as may serve a particular implementation. Furthermore, although the components of FIG. 10 are described in connection with the asset extraction system 102, at least some of the components for performing operations in conjunction with the asset extraction system 102 described herein may be implemented on other devices within the environment.

The components of the asset extraction system 102 can include software, hardware, or both. For example, the components of the asset extraction system 102 can include one or more instructions stored on a computer-readable storage medium and executable by processors of one or more computing devices (e.g., the computing device 1000). When executed by the one or more processors, the computer-executable instructions of the asset extraction system 102 can cause the computing device 1000 to perform the methods described herein. Alternatively, the components of the asset extraction system 102 can comprise hardware, such as a special purpose processing device to perform a certain function or group of functions. Additionally or alternatively, the components of the asset extraction system 102 can include a combination of computer-executable instructions and hardware.

Furthermore, the components of the asset extraction system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the asset extraction system 102 may be implemented as part of a stand-alone application on a personal computing device or a mobile device. Alternatively or additionally, the components of the asset extraction system 102 may be implemented in any application that allows creation and delivery of marketing content to users, including, but not limited to, applications in ADOBE EXPERIENCE MANAGER and ADOBE CREATIVE CLOUD, such as ADOBE ILLUSTRATOR, ADOBE XD, and ADOBE INDESIGN. "ADOBE," "ADOBE EXPERIENCE MANAGER," "ADOBE CREATIVE CLOUD," "ADOBE ILLUSTRATOR," "ADOBE XD," and "ADOBE INDESIGN" are trademarks of Adobe Inc. in the United States and/or other countries FIGS. 1-10, the corresponding text, and the examples provide a number of different systems, methods, and non-transitory computer readable media for generating a set of reusable geometric assets based on identifying and filtering patterns corresponding to objects within a digital image. In addition to the foregoing, embodiments can also be described in terms of flowcharts comprising acts for accomplishing a particular result. For example, FIG. 11 illustrates a flowchart of an example sequence or series of acts in accordance with one or more embodiments.

Figure 11:
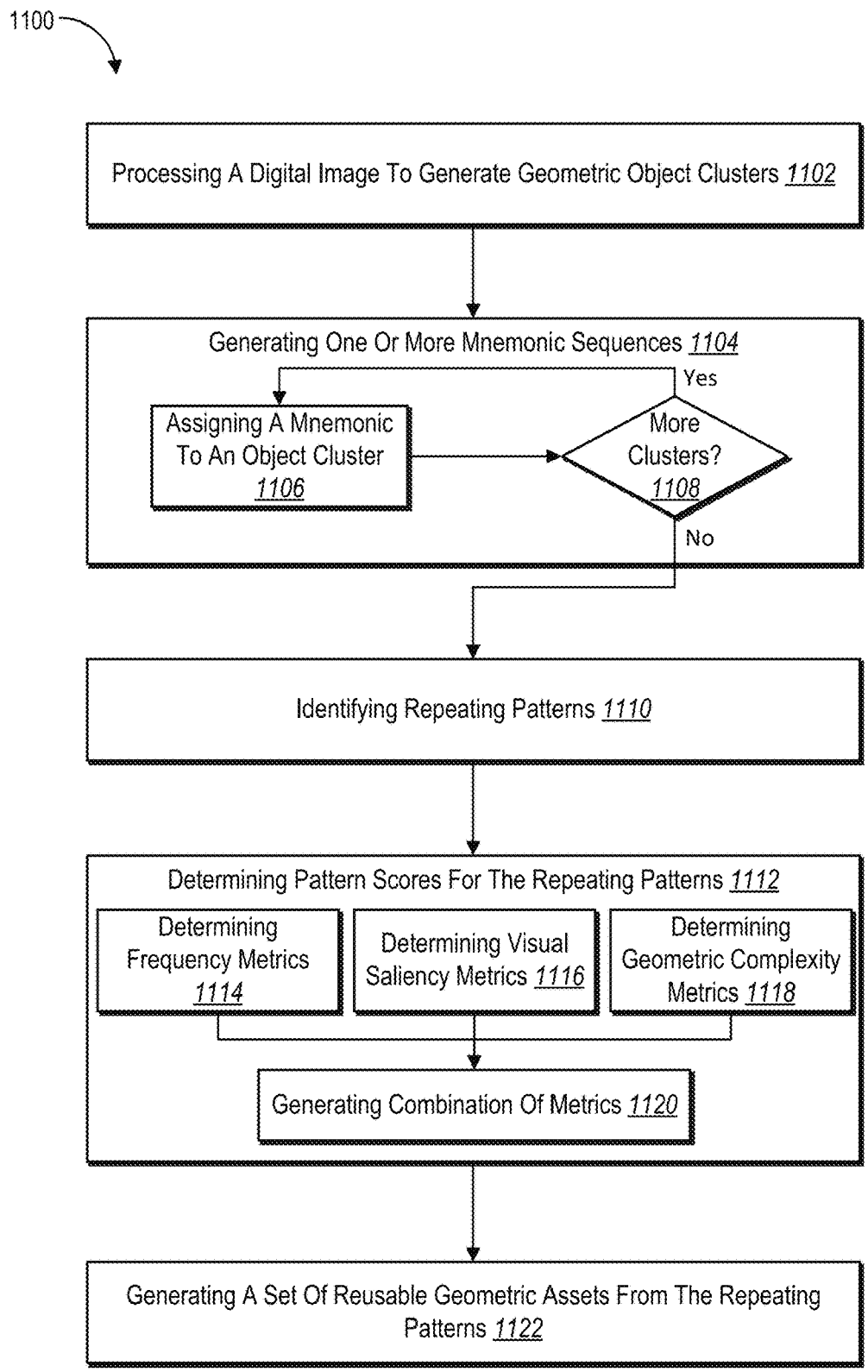
FIG. 11 illustrates a flowchart of a series of acts for generating a set of reusable geometric assets from a digital image by identifying and filtering patterns of mnemonics corresponding to geometric objects within the digital image in accordance with one or more embodiments.

While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 of generating a set of reusable geometric assets based on identifying and filtering patterns corresponding to objects within a digital image. In particular, the series of acts 1100 includes an act 1102 of processing a digital image to generate geometric object clusters. For example, the act 1102 can include processing a digital image comprising a plurality of geometric objects utilizing a clustering algorithm to generate geometric object clusters.

As shown, the series of acts 1100 also includes an act 1104 of generating one or more mnemonic sequences. In particular, the act 1104 can involve generating one or more mnemonic sequences from the digital image by assigning mnemonics to the geometric object clusters and utilizing the mnemonics to represent geometric objects from the geometric object clusters within the digital image. Indeed, as shown in FIG. 11, the act 1104 can include an act 1106 of assigning a mnemonic to an object cluster. In addition, the act 1104 can include an act 1108 determining whether there are additional clusters without assigned mnemonics. The asset extraction system 102 repeats the acts 1106 and 1108 until all clusters have an assigned mnemonic. The act 1104 can involve generating the one or more mnemonic sequences by combining the assigned mnemonics of the geometric object clusters together to form a string of mnemonics to represent the geometric objects within the digital image.

The series of acts 1100 also includes an act 1110 of identifying repeat patterns. In particular, the act 1110 can involve identifying a plurality of repeating patterns within the one or more mnemonic sequences from the digital image. For example, the act 1110 can involve analyzing the one or more mnemonic sequences to identify non-overlapping occurrences of maximal patterns that repeat within the one or more mnemonic sequences. The act 1110 can also involve excluding, from the plurality of repeating patterns, one or more patterns that have zero non-overlapping repeats within the one or more mnemonic sequences. In addition, the act 1110 can involve identifying, within the one or more mnemonic sequences, patterns of mnemonics that have one or more counts of non-overlapping repeat occurrences.

The series of acts 1100 can also include an act of generating a filtered pattern set. Generating a filtered pattern set can involve generating a filtered pattern set from a plurality of repeating patterns in the one or more mnemonic sequences by identifying redundant patterns from the plurality of repeating patterns and excluding the redundant patterns. Generating the filtered pattern set can also (or alternatively) involve identifying a redundant pattern comprising one or more of a single sub-pattern or a pattern that repeats only inside a larger non-redundant pattern and excluding the redundant pattern from the filtered pattern set. Further, generating the filtered pattern set can involve identifying a sub-sequence within an encompassing sequence, determining a repeat count of the sub-sequence and a repeat count of the encompassing sequence, determining that the sub-sequence is a redundant pattern by comparing the repeat count of the sub-sequence and the repeat count of the encompassing sequence, and excluding the redundant pattern from the filtered pattern set. Additionally, generating the filtered pattern set can involve generating a planar arrangement of faces and edges of geometric objects within a pattern, determining that the pattern is a spatially redundant pattern by analyzing connectivity of the faces and the edges of the geometric objects within the pattern to determine that the pattern comprises one or more disjoint objects, and excluding the spatially redundant pattern from the filtered pattern set. Determining that a pattern is a spatially redundant pattern can involve determining at least one geometric complexity metric of the pattern based on the faces and the edges of the geometric objects associated with the pattern and comparing the at least one geometric complexity metric to a geometric complexity threshold.

As further shown, the series of acts 1100 includes an act 1112 of determining pattern scores for repeating patterns. In particular, the act 1112 can involve determining pattern scores for the plurality of repeating patterns based on at least one of frequency metrics, visual saliency metrics, or geometric complexity metrics of the plurality of repeating patterns. As shown, the act 1112 can include an act 1114 of determining frequency metrics, an act 1116 of determining visual saliency metrics, and an act 1118 of determining geometric complexity metrics. Further, the act 1112 can include an act 1120 of generating a combination of the metrics for a pattern score. The act 1114 can involve determining quantities of repeat occurrences of the plurality of repeating patterns within the one or more mnemonic sequences. The act 1116 can involve determining, for geometric objects corresponding to mnemonics within the filtered pattern set, pixel areas occupied by the geometric objects within the digital image. The act 1118 can involve combining a set of planar faces and a set of planar edges of the geometric objects corresponding to the mnemonics within the filtered pattern set. The act 1120 can involve identifying a frequency weight, a visual saliency weight, and a geometric complexity weight and combining the frequency metrics, the visual saliency metric, and the geometric complexity metric utilizing the frequency weight, the visual saliency weight, and the geometric complexity weight.

The act 1112 can involve determining the frequency metrics based on quantities of repeat occurrences of the plurality of repeating patterns. In addition, the act 1112 can involve determining the visual saliency metrics based on areas of the digital image occupied by geometric objects corresponding to mnemonics of the plurality of repeating patterns. The act 1112 can further involve determining the geometric complexity metrics based on counts of planar faces and counts of planar edges of the geometric objects corresponding to the mnemonics of the plurality of repeating patterns. Further still, the act 1112 can involve generating a weighted combination of the frequency metrics, the visual saliency metrics, and the geometric complexity metrics.

Additionally, the series of acts 1100 includes an act 1122 of generating a set of reusable geometric assets from the repeating patterns. In particular, the act 1122 can involve generating a set of reusable geometric assets from the plurality of repeating patterns utilizing the pattern scores. The act 1122 can involve selecting the set of reusable geometric assets by comparing the pattern scores to a pattern score threshold.

The series of acts 1100 can include an act of generating a filtered pattern set from the plurality of repeating patterns by identifying redundant patterns from the plurality of repeating patterns and removing the redundant patterns. Identifying redundant patterns can involve identifying one or more of a pattern that consists of a single, repeating sub-pattern or a pattern that repeats only inside a larger non-redundant pattern.

In some embodiments, the series of acts 1100 includes an act of ranking the plurality of repeating patterns in accordance with the pattern scores and an act of, based on the ranking, generating the set of reusable geometric assets by selecting sets geometric objects corresponding to the plurality of repeating patterns. The series of acts 1100 can further include an act of generating a modified digital image by adding one or more of the reusable geometric assets to an initial digital image. The series of acts 1100 can include acts of providing the set of reusable geometric assets for display as selectable icons within a digital image editing interface and, based on user selection of one or more reusable geometric assets from the set of reusable geometric assets, adding the one or more reusable geometric assets to one or more digital images to generate one or more modified digital images. Indeed, the series of acts 1100 can include an act of, based on the pattern scores, providing, for display via a graphical user interface, a set of reusable geometric assets identified from the patterns. Further, the series of acts 1100 can include an act of, based on user selection of one or more reusable geometric assets from the set of reusable geometric assets, adding the one or more reusable geometric assets to one or more digital images to generate one or more modified digital images.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
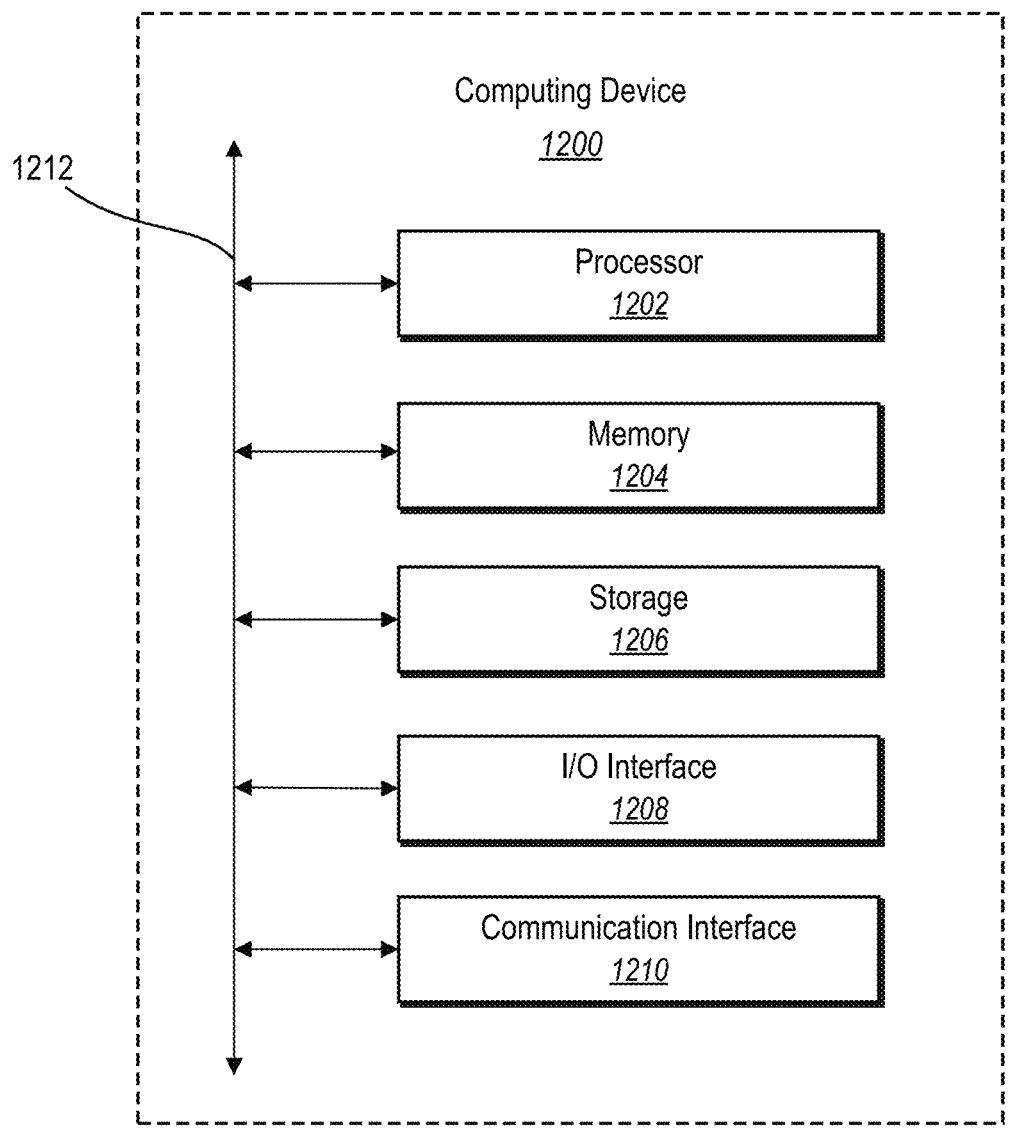
FIG. 12 illustrates a block diagram of an example computing device in accordance with one or more embodiments.

FIG. 12 illustrates, in block diagram form, an example computing device 1200 (e.g., the computing device 1000, the client device 108, and/or the server(s) 104) that may be configured to perform one or more of the processes described above. One will appreciate that the asset extraction system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
    process a digital image comprising a plurality of geometric objects utilizing a clustering algorithm to generate geometric object clusters;
    generate one or more mnemonic sequences from the digital image by assigning mnemonics to the geometric object clusters and utilizing the mnemonics to represent geometric objects from the geometric object clusters within the digital image;
    identify a plurality of repeating patterns within the one or more mnemonic sequences from the digital image;
    determine pattern scores for the plurality of repeating patterns based on at least one of frequency metrics, visual saliency metrics, or geometric complexity metrics of the plurality of repeating patterns; and
    generate a set of reusable geometric assets from the plurality of repeating patterns utilizing the pattern scores.

2. The non-transitory computer readable medium of claim 1, further comprising instructions that, when executed by the at least one processor, cause the computing device to identify the plurality of repeating patterns by:
    analyzing the one or more mnemonic sequences to identify non-overlapping occurrences of maximal patterns that repeat within the one or more mnemonic sequences; and
    excluding, from the plurality of repeating patterns, one or more patterns that have zero non-overlapping repeats within the one or more mnemonic sequences.

3. The non-transitory computer readable medium of claim 1, further comprising instructions that, when executed by the at least one processor, cause the computing device to generate a filtered pattern set from the plurality of repeating patterns by identifying redundant patterns from the plurality of repeating patterns and removing the redundant patterns.

4. The non-transitory computer readable medium of claim 3, further comprising instructions that, when executed by the at least one processor, cause the computing device to identify redundant patterns by identifying one or more of:
  a pattern that consists of a single, repeating sub-pattern; or
  a pattern that repeats only inside a larger non-redundant pattern.

5. The non-transitory computer readable medium of claim 1, further comprising instructions that, when executed by the at least one processor, cause the computing device to determine the pattern scores for the plurality of repeating patterns by:
  determining the frequency metrics based on quantities of repeat occurrences of the plurality of repeating patterns;
  determining the visual saliency metrics based on areas of the digital image occupied by geometric objects corresponding to mnemonics of the plurality of repeating patterns; and
  determining the geometric complexity metrics based on counts of planar faces and counts of planar edges of the geometric objects corresponding to the mnemonics of the plurality of repeating patterns.

6. The non-transitory computer readable medium of claim 1, further comprising instructions that, when executed by the at least one processor, cause the computing device to determine the pattern scores for the plurality of repeating patterns by generating a weighted combination of the frequency metrics, the visual saliency metrics, and the geometric complexity metrics.

7. The non-transitory computer readable medium of claim 1, further comprising instructions that, when executed by the at least one processor, cause the computing device to:
  rank the plurality of repeating patterns in accordance with the pattern scores; and
  based on the ranking, generate the set of reusable geometric assets by selecting sets geometric objects corresponding to the plurality of repeating patterns.

8. The non-transitory computer readable medium of claim 1, further comprising instructions that, when executed by the at least one processor, cause the computing device to generate a modified digital image by adding one or more of the reusable geometric assets to an initial digital image.

9. A system comprising:
  one or more memory devices comprising a digital image comprising a plurality of geometric objects; and
  one or more computing devices that are configured to cause the system to:
    process the digital image utilizing a clustering algorithm to generate geometric object clusters;
    generate one or more mnemonic sequences from the digital image by assigning mnemonics to the geometric object clusters;
    generate a filtered pattern set from a plurality of repeating patterns in the one or more mnemonic sequences by identifying redundant patterns from the plurality of repeating patterns and excluding the redundant patterns;
    determine pattern scores for patterns within the filtered pattern set based on frequency metrics, visual saliency metrics, and geometric complexity metrics of the patterns; and
    generate a set of reusable geometric assets by selecting a subset of the patterns utilizing the pattern scores.

10. The system of claim 9, wherein the one or more computing devices are further configured to cause the system to identify the plurality of repeating patterns by identifying, within the one or more mnemonic sequences, patterns of mnemonics that have one or more counts of non-overlapping repeat occurrences.

11. The system of claim 9, wherein the one or more computing devices are further configured to cause the system to generate the filtered pattern set by:
  identifying a redundant pattern comprising one or more of a single sub-pattern or a pattern that repeats only inside a larger non-redundant pattern; and
  excluding the redundant pattern from the filtered pattern set.

12. The system of claim 9 wherein the one or more computing devices are further configured to cause the system to generate the filtered pattern set by:
  identifying a sub-sequence within an encompassing sequence;
  determining a repeat count of the sub-sequence and a repeat count of the encompassing sequence;
  determining that the sub-sequence is a redundant pattern by comparing the repeat count of the sub-sequence and the repeat count of the encompassing sequence; and
  excluding the redundant pattern from the filtered pattern set.

13. The system of claim 9, wherein the one or more computing devices are further configured to cause the system to generate the filtered pattern set by:
  generating a planar arrangement of faces and edges of geometric objects within a pattern;
  determining that the pattern is a spatially redundant pattern by analyzing connectivity of the faces and the edges of the geometric objects within the pattern to determine that the pattern comprises one or more disjoint objects; and
  excluding the spatially redundant pattern from the filtered pattern set.

14. The system of claim 13, wherein the one or more computing devices are further configured to cause the system to determine that the pattern is a spatially redundant pattern by:
  determining at least one geometric complexity metric of the pattern based on the faces and the edges of the geometric objects associated with the pattern; and
  comparing the at least one geometric complexity metric to a geometric complexity threshold.

15. The system of claim 9, wherein the one or more computing devices are further configured to cause the system to:
  determine the frequency metrics by determining quantities of repeat occurrences of the plurality of repeating patterns within the one or more mnemonic sequences;
  determine the visual saliency metrics by determining, for geometric objects corresponding to mnemonics within the filtered pattern set, pixel areas occupied by the geometric objects within the digital image; and
  determine the geometric complexity metrics by combining a set of planar faces and a set of planar edges of the geometric objects corresponding to the mnemonics within the filtered pattern set.

16. The system of claim 9, wherein the one or more computing devices are further configured to cause the system to determine the pattern scores for the patterns within the filtered pattern set by:
  identifying a frequency weight, a visual saliency weight, and a geometric complexity weight; and
  combining the frequency metrics, the visual saliency metric, and the geometric complexity metric utilizing the frequency weight, the visual saliency weight, and the geometric complexity weight.

17. The system of claim 9, wherein the one or more computing devices are further configured to cause the system to:
- provide the set of reusable geometric assets for display as selectable icons within a digital image editing interface; and
- based on user selection of one or more reusable geometric assets from the set of reusable geometric assets, add the one or more reusable geometric assets to one or more digital images to generate one or more modified digital images.

18. A computer-implemented method for generating structured sets of reusable geometric assets from digital images, the computer-implemented method comprising:
- processing a digital image utilizing a clustering algorithm to generate geometric objects clusters;
- generating one or more mnemonic sequences from the digital image by assigning mnemonics to the geometric object clusters;
- performing a step for determining pattern scores for patterns among the one or more mnemonic sequences;
- based on the pattern scores, providing, for display via a graphical user interface, a set of reusable geometric assets identified from the patterns; and
- based on user selection of one or more reusable geometric assets from the set of reusable geometric assets, adding the one or more reusable geometric assets to one or more digital images to generate one or more modified digital images.

19. The computer-implemented method of claim 18, further comprising selecting the set of reusable geometric assets by comparing the pattern scores to a pattern score threshold.

20. The computer-implemented method of claim 18, wherein generating the one or more mnemonic sequences comprises combining the assigned mnemonics of the geometric object clusters together to form a string of mnemonics to represent the geometric objects within the digital image.

* * * * *